United States Patent
Giannini et al.

(10) Patent No.: US 7,062,454 B1
(45) Date of Patent: Jun. 13, 2006

(54) PREVIEWING SYSTEM AND METHOD

(75) Inventors: Robert Giannini, Hoboken, NJ (US); Joseph L. Parkinson, Boise, ID (US); David S. Hoover, New Tripoli, PA (US); Fred M. Kimock, Allentown, PA (US); Leslie L. Barkley, King of Prussia, PA (US); Stephen P. Kowalchuk, Lower Saucon, PA (US)

(73) Assignee: Jarbridge, Inc., Boise, ID (US)

( * ) Notice: Subject to any disclaimer, the term of this patent is extended or adjusted under 35 U.S.C. 154(b) by 624 days.

(21) Appl. No.: 09/307,261

(22) Filed: May 6, 1999

(51) Int. Cl.
*G06F 17/60* (2006.01)

(52) U.S. Cl. .......................................... 705/27; 705/26

(58) Field of Classification Search .................. 705/14, 705/26, 27
See application file for complete search history.

(56) References Cited

U.S. PATENT DOCUMENTS

| | | | |
|---|---|---|---|
| 4,149,246 A | 4/1979 | Goldman | 700/132 |
| 4,232,334 A | 11/1980 | Dyson | 348/77 |
| 4,261,012 A | 4/1981 | Maloomian | 348/77 |
| 4,297,724 A | 10/1981 | Masuda et al. | 348/77 |
| 4,434,467 A | 2/1984 | Scott | 700/90 |
| 4,539,585 A | 9/1985 | Spackova et al. | 382/100 |
| 4,546,434 A | 10/1985 | Gioello | 700/90 |
| 4,731,743 A | 3/1988 | Blancato | 345/632 |
| 4,845,636 A | 7/1989 | Walker | 700/237 |
| 4,872,056 A | 10/1989 | Hicks et al. | 348/584 |
| 4,964,043 A | 10/1990 | Galvin | 705/27 |
| 4,991,005 A | 2/1991 | Smith | 348/77 |
| 5,053,956 A | 10/1991 | Donald et al. | 713/601 |
| 5,111,392 A | 5/1992 | Malin | 705/29 |
| 5,117,354 A | 5/1992 | Long et al. | 705/27 |

(Continued)

FOREIGN PATENT DOCUMENTS

EP 0 905 563 A2 * 3/1999

OTHER PUBLICATIONS

Orr, J.N., "Good Design," CAE, vol. 11, No. 6, pp. 62, Jun. 1992.*
Taylor, W., "Windows Draw 4.0," PC/Computing, vol. 9, No. 4, p. 204, Apr. 1, 1996.*
Anon., Newsbytes News Network, "Comdex—Free Graphics E-mail from SPC Software," Nov. 19, 1997.*
Anon., Microsoft Press Computer Dictionary, Third Edition, Microsoft Press, Redmond, 1997, pp. 92, 197, and 430.*
Anon., "Sunglass Hut's Eyes Are Focused on the Internet," Chain Store Age Executive, vol. 74, No. 9, p. 188+, Sep. 1998.*

(Continued)

*Primary Examiner*—Nicholas D. Rosen
(74) *Attorney, Agent, or Firm*—Crawford Maunu PLLC; Robert J. Crawford

(57) ABSTRACT

A method and system for previewing accessories prior to purchasing is disclosed. In one embodiment a first image of a portion of a person can be provided to an input device. Then, a second image including an image of an accessory is selected from an electronic database of accessory images. After obtaining the first and second images, data of the first and second images are used to generate data of a composite image, preferably on a server computer. The composite image is displayed on an output device and includes an image of the accessory on the person. The input device, the output device, and the client computer can be located at a first location, while the server computer is located at a second location. In this image, the accessory can be previewed by the customer before purchasing the accessory. Preferably, the accessories include sunglasses, jewelry, eyeglasses or other personal fashion items, which are purchased over the Internet or at a kiosk in communication with the Internet.

40 Claims, 13 Drawing Sheets

U.S. PATENT DOCUMENTS

| | | | | |
|---|---|---|---|---|
| 5,163,006 A | | 11/1992 | Deziel | 700/132 |
| 5,163,007 A | | 11/1992 | Slilaty | 700/132 |
| 5,195,030 A | * | 3/1993 | White | 705/26 |
| 5,206,804 A | | 4/1993 | Thies et al. | 705/27 |
| 5,339,252 A | | 8/1994 | White et al. | 700/98 |
| 5,440,479 A | | 8/1995 | Hutton | 705/26 |
| 5,495,568 A | | 2/1996 | Beavin | 700/83 |
| RE35,184 E | | 3/1996 | Walker | 700/231 |
| 5,504,845 A | | 4/1996 | Vecchione | 345/419 |
| 5,515,268 A | | 5/1996 | Yoda | 705/26 |
| 5,530,652 A | | 6/1996 | Croyle et al. | 700/130 |
| 5,539,677 A | * | 7/1996 | Smith | 705/26 |
| 5,550,746 A | | 8/1996 | Jacobs | 700/231 |
| 5,555,496 A | | 9/1996 | Tackbary et al. | 705/27 |
| 5,559,714 A | | 9/1996 | Banks et al. | 700/233 |
| 5,608,852 A | | 3/1997 | Hashimoto et al. | 345/160 |
| 5,611,730 A | | 3/1997 | Weiss | 463/20 |
| 5,684,963 A | | 11/1997 | Clement | 705/26 |
| 5,694,551 A | | 12/1997 | Doyle et al. | 705/26 |
| 5,724,522 A | | 3/1998 | Kagami et al. | 705/26 |
| 5,729,699 A | | 3/1998 | Hashimoto et al. | 705/27 |
| 5,737,729 A | | 4/1998 | Denman | 705/401 |
| 5,742,931 A | | 4/1998 | Spiegelhoff | 705/8 |
| 5,745,681 A | | 4/1998 | Levine et al. | 709/200 |
| 5,754,850 A | | 5/1998 | Janssen | 707/104.1 |
| 5,822,216 A | | 10/1998 | Satchell, Jr. et al. | 700/232 |
| 5,822,739 A | | 10/1998 | Kara | 705/410 |
| 5,845,263 A | | 12/1998 | Camaisa et al. | 705/27 |
| 5,850,222 A | | 12/1998 | Cone | 345/418 |
| 5,852,809 A | | 12/1998 | Abel et al. | 705/26 |
| 5,864,851 A | | 1/1999 | Breitbart et al. | 707/8 |
| 5,870,140 A | | 2/1999 | Gillberry | 348/160 |
| 5,870,718 A | | 2/1999 | Spector | 705/26 |
| 5,870,771 A | | 2/1999 | Oberg | 707/502 |
| 5,880,974 A | | 3/1999 | Tarumi et al. | 703/21 |
| 5,884,029 A | | 3/1999 | Brush, II et al. | 709/202 |
| 5,892,946 A | | 4/1999 | Woster et al. | 709/316 |
| 5,895,454 A | | 4/1999 | Harrington | 705/26 |
| 5,905,973 A | | 5/1999 | Yonezawa et al. | 705/27 |
| 5,923,324 A | | 7/1999 | Berry et al. | 345/852 |
| 5,930,769 A | | 7/1999 | Rose | 705/27 |
| 5,946,665 A | | 8/1999 | Suzuki et al. | 705/26 |
| 5,950,165 A | | 9/1999 | Shaffer et al. | 704/270 |
| 5,950,173 A | | 9/1999 | Perkowski | 705/26 |
| 5,970,471 A | * | 10/1999 | Hill | 705/26 |
| 5,983,201 A | * | 11/1999 | Fay | 705/27 |
| 6,016,504 A | | 1/2000 | Arnold et al. | 709/200 |
| 6,083,267 A | * | 7/2000 | Motomiya et al. | 703/6 |
| 6,177,936 B1 | * | 1/2001 | Cragun | 345/760 |
| 6,331,858 B1 | * | 12/2001 | Fisher | 345/582 |

OTHER PUBLICATIONS

Langberg, M., Technology Testdrive Column in San Jose Mercury News, Jan. 10, 1999.*

"The World's First Whole Body Scanners Bring True Human Forms to Computer Graphics," http://www.cyberware.com/pressReleases/firstWB.html (May, 11, 1995), 1 page.

"ModaCAD Latest to Seek 'Net Gain on Apparel," http://www.apparelnews.net/Archive/082898/fashion/fashfeat.html (Aug. 28, 1998), 3 pages.

"Wicks and Wilson TriForm® 3D system helps to take goalkeeping into the space age," http://www/wwl.co.uk/pr07.htm (9/98), 2 pages.

"TriForm® BodyScan booth—first time in USA," http://www.wwl.co.uk/pr15.htm (Aug. 1999), 2 pages.

"Wicks and Wilson announces its first Body Scanning booth," http://wqww.wwl.co.uk/pr09.htm (Dec. 1998), 2 pages.

"Modacad, Inc. Launches Women's E-commerce 'Style'Shopping Site," http://www.urlwire.com/newsarchive/050399a.html (May 3, 1999), 2 pages.

"Populating the Web: Pioneering a paradigm for photorealistic Avatars," http://www.avatarme.com/concept/concept.htm (Aug. 1999), 5 pages.

"PhotoModeler High Quality Photo-Textured Objects," http://www.eossystems.com/phototex.htm (©1995–1999), 10 pages.

*Land's End Direct Merchants* Catalogue (Sep. 1999), p. 101.

"Macys.Com To Sell Borderbund Makeover Software," http://dailynews.hayoo.com/h/nm/19990903/tc/macyscom_2.html (Sep. 3, 1999), 2 pages.

"If the Jeans Fit . . . p. 3: Three Hours Later," http://www.upside.com (Sep. 3, 1999), 1 page.

"When Off-The-Rack becomes Off-The-Net," *Scientific American Presents Your Bionic Future* (Nov. 1999), 5 pages.

"Macys's Eases Swimsuit Fear with Database," http://www.wired.com/news/story/3226.html (Apr. 17, 1997), 2 pages.

"Fashion Studio," http://www.dynagraphicsinc.com/main.htm (Sep. 14, 1999), 4 pages.

"What is the Dressing Sim?," http://www.toyobo.co.jp/e/mirai/dr..gsim/TopPage/aboutDressingSim.html (Sep. 14, 1999), 5 pages.

Nebojsa Jojic, http://www.ifp.uiuc.edu/~jojic/ (Sep. 14, 1999), 5 pages.

A Framework for Garment Shopping over the Internet, Jojic et al., *Handbook of Electronic Commerce* (May 1999), 22 pages.

Media Motion Publications, Flash 'N Fashion™ (® 1995–1997) 3 pages.

Meta Creations Poser4, (Sep. 14, 1999), 3 pages.

"3D Metrics—Capturing the Dimension of Life," http://www.3dmetrics.com (©1999), 1 page.

"Welcome to Click Dress," http://www.hi–pic.co.il/ (Dec. 7, 1999), 1 page.

"Killer Loop Virtual Preview," http://www.killerloopeyewear.com/html/klvp.html (Dec. 2, 1999), 1 page.

"Welcome to Ray-Ban Virtual Preview," http://www.ray-ban.com/htm/rbvp.html (Dec. 2, 1999), 2 pps.

QuickyMart ™ Cuts Cost, Eases Set-Up of 'Me-Commerce' Sites: PR Newswire (Jul. 28,1999).

"Herman Miller'New online 'Room Planner' Makes Designing from Home Fun and Easy" PR Newswire (Mar. 18, 1999).

"How to Fit Sunglasses Frames To Face Shapes", http://www.peepsun.com/face_shapes.htm (Apr. 1999) pp. 1–3.

"Interactive Frame Selector", wysiwyg://www.right.6/http://www.pearlevision.com/ifs.htm (Apr. 1999) P. 1.

"XOOM.com Announces The Cosmopolitan Virtual Makeover!", http://orders.xoom.com/cosmo/bgnoise/ (Apr. 1999), pp. 1–3.

"Untitled", http:www.virtualmakeover.co.uk/style_text.html (1997–1998), p. 1.

"Press Release—SegaSoft Announces the Launch of Cosmopolitan Virtual Makeover. A breakthrough CD–ROM targeted specifically to women.", http:marketwiz.net/cosmo/press.html (Jun. 1997), pp. 1–3.

"Product Information for Cosmopolitan Virtual Makeover", http://www.beyond.com/PKIN645420/prod.htm (Apr. 1999), p. 1.

IT Reviews—PC software reviews—. . . osmopolitan Virtual Makeover (SegaSoft), Aug. 15, 1998, http://www.intreviews.co.uk/software/s19.htm (Aug. 1998), pp. 1–2.

* cited by examiner

FIG. 7

CONGRATULATIONS! YOU HAVE SENT AN IMAGE TO OURSITE VIA E-MAIL. IF YOUR IMAGE IS AVAILABLE YOU SHOULD HAVE RECEIVED A PIN # VIA E-MAIL.

ENTER PIN #

ENTER

PREVIEWING SYSTEM AND METHOD

TECHNICAL FIELD OF THE INVENTION

Embodiments of the invention relate to systems and methods for previewing an accessory on a person before purchasing the accessory.

BACKGROUND OF THE INVENTION

Purchasing accessories can be a difficult and time consuming process. For example, a customer shopping for a pair of sunglasses typically travels to a store selling sunglasses. At the store, the customer reviews the sunglasses displayed in the store. The customer then selects a pair of sunglasses from the displayed sunglasses, and then looks at a mirror to evaluate his or her appearance. If the sunglasses feel uncomfortable or do not complement the customer's face in a manner pleasing to the customer, the customer tries on another pair of sunglasses. This iterative process continues until the customer finds a suitable pair of sunglasses.

Purchasing accessories in this manner has many disadvantages. First, purchasing accessories in this manner is very time consuming. Accessories are typically much more ornamental than other articles worn on the body (e.g. a suit or dress). Consequently, finding an accessory that suitably complements the appearance of the intended recipient can take a long time. For exanple, it would not be unusual.for a customer to spend an entire morning or afternoon shopping before a suitable pair of sunglasses is found. The purchasing time may be even longer if for example, the customer does not find a suitable pair of sunglasses at the first store visited by the customer. In this instance, the customer must travel to another store, and the lengthy iterative selection process starts again. Second, the variety and quantity of accessories in a store is often limited by the available space in a store. For example, only a limited number of sunglasses can be displayed on a display rack in a store. It is desirable to present the customer with as many different accessories as possible to provide the customer with as many choices as possible. Third, when shopping, customers often feel pressured to try on the accessories more quickly than they would like to. For example, the customer may feel that lingering in front of an accessory display or consulting with sales associates for long periods of time would be inconsiderate to other customers. This is especially true if the accessories for sale are locked behind a glass display, which is accessible only to store employees. Consequently, the customer may try on fewer accessories than he or she would like to try on and may be pressured to purchase items that they, may not be fully satisfied with. Fourth, some accessories cannot be physically placed on the body at the store. For example, for sanitary reasons, many stores do not permit customers to try on earrings before purchasing them. Consequently, it is difficult evaluate the appearance of such accessories on the intended recipient.

There are also many additional disadvantages to purchasing sunglasses using conventional purchasing processes. For example, a customer evaluating a pair of sunglasses using conventional processes does not view an accurate image of how he or she would be viewed by persons not wearing sunglasses. When a customer wearing sunglasses looks into a mirror, the image seen by the customer, while accurate in form, is shaded by the sunglass lenses. Also, if the lenses of the sunglasses are scratched, smudged, or partially covered by labels, the customer's vision may be obscured making it difficult to see his or her image in the mirror. It is important for the customer to be able to accurately evaluate his or her true appearance in a pair of sunglasses, because sunglasses are purchased for their ornamental features as well as their functional features. Moreover, unlike clothing, sunglasses typically are not categorized by size in stores. Rather, sunglasses of different sizes are often commingled together in a display. It is therefore likely that, during the purchasing process, the customer will select several pairs of sunglasses which will not fit. This can make the purchasing process long and frustrating.

Conventional processes for evaluating and purchasing prescription eyeglasses are also difficult for the customer. When trying on a pair of prescription eyeglasses, a customer typically browses through many eyeglass frames on a display, selects a pair of eyeglass frames, removes his or her eyeglasses, places the selected eyeglass frames on his or her face, and then looks into a mirror. This process is repeated until one or more desired frames are found. Because the customer in this situation is vision impaired, the customer has a difficult time evaluating his or her appearance in the mirror. For example, if the customer is near-sighted, the customer typically moves his or her face very close to the mirror, and then strains to see what he or she looks like in the frames. Consequently, the customer has much difficulty perceiving how he or she might appear to others when wearing a pair of eyeglasses having the selected frames. Moreover, the frames being sampled typically do not have lenses.in them. Even if the customer can see himself or herself in a mirror wearing a selected pair of eyeglass frames, the customer cannot perceive how he or she might look if lenses are. present in the frames. This is especially true if the customer wants to preview how he or she might look in a particular pair of eyeglass frames having tinted, colored, or anti-reflective lenses in them.

Some of the disadvantages of traditional accessory purchasing processes have been addressed by mail order catalogs and the Internet. For example, purchasing. accessories through a mail order catalog or the Internet is faster than shopping at a store, because the time needed to travel to the store is eliminated. However, purchasing accessories through mail order catalogs and the Internet unfortunately have a number of disadvantages. For instance, because the customer cannot physically try on or preview the accessory on the intended recipient, the purchased accessory many times will not fit or suit the tastes of the customer. If the accessory does not fit or is otherwise unsuitable, the customer must return the accessory to the seller for a refund or exchange. Returning unsuitable accessories is typically done at the customer's expense and is time consuming. For example, the customer must repackage the accessory and then send it back to the seller in order to obtain a refund or exchange.

Accordingly, it would be highly desirable to provide an improved system and method for purchasing accessories.

SUMMARY OF THE INVENTION

Embodiments of the invention provide a customer with an interactive approach to previewing and purchasing accessories such as sunglasses. By using embodiments of the invention, accessories such as sunglasses on the intended recipient are quickly and accurately previewed by a customer.

One embodiment of the invention is directed to a method comprising providing a first image to an input device at a first location, where the first image includes at least a portion of a person. The method also includes transmitting data of the first image to a server computer at a second location, selecting a second image from an electronic database of images on or accessible to the server computer, where the second image comprises an image of an accessory to be worn on the portion of the person in the first image. Data of a composite image is generated from the data of the first image and data of the second image with the server computer, and the composite image is displayed on an output device at the first location. Preferably, the accessory comprises a pair of sunglasses.

Another embodiment of the invention is directed to a method comprising-providing data of the first image of at least a portion of an intended recipient of an accessory to a server computer, selecting a second image from an electronic database of images on or accessible to the server computer, generating data of a composite image from the data of the first image and data of the second image with the server computer, transmitting the data of the composite image from the server computer to a client computer, and displaying the composite image on an output device in communication with the client computer. The second image comprises an image of an accessory to be worn on the portion of the intended recipient in the first image.

Another embodiment of the invention can be directed to a method comprising generating a first composite image from a first image of the person and a first accessory image, displaying the first composite image, saving the first composite image, generating a second composite image from a second image of the person and a second accessory image, and displaying the second composite image and the saved first composite image to a customer simultaneously such that the customer can compare the appearance of the first and second accessories on the person.

Another embodiment of the invention is directed to a system comprising an input device for receiving a first image, wherein the first image includes an image of at least a portion of a person. The system also includes a client computer and a server computer including a first computer program for selecting data of a second image from an electronic database of images and a second computer program for generating data of a composite image from data of the first image and data of the second image. The second image comprises an image of an accessory to be worn on the portion of the person in the first image. In the system, an output device for displaying the composite image is operatively coupled to the client computer.

Another embodiment of the invention can be directed to a system comprising an information storage medium comprising a first electronic database of images of people, a server computer including (i) a first computer program for selecting a first image from the first electronic database, the first image comprising an image of at least a portion of an intended recipient of an accessory, (ii) a second computer program for selecting a second image from a second electronic database, the second image comprising an image of an accessory to be worn on the portion of the person in the first image, and (iii) a third computer program for generating data of a composite image from the data of the first image and data of the second image, a client computer, and an output device for displaying the composite image.

Another embodiment of the invention is directed to a system comprising a server computer comprising (i) a first computer program for selecting data of a first accessory image from an electronic database, (ii) a second computer program for generating data of a first composite image from data of the first accessory image and data of an image of at least a portion of a person, (ii) a third computer program for selecting data of a second accessory image from the electronic database, and (iv) a fourth computer program for generating data of a second composite image from data of the second accessory image and data of the image of at least a portion of the person. The system also comprises an information storage medium for saving data of the first composite image, a client computer, and a display device for displaying the first and second composite images to a customer.

Yet another embodiment of the invention is directed to an electronic display screen comprising a previously saved first composite image generated from an image of a person and an image of a first accessory, and a second composite image generated from the image of the person and an image of a second accessory, wherein the first and second accessories are different.

Yet another embodiment of the invention is directed to a method for permitting a customer to preview and purchase accessories. In this embodiment, the method comprises providing an image of an intended recipient of an accessory to an input device, displaying plural accessory images to the customer for evaluation, selecting an accessory image from the displayed accessory images, displaying a composite image comprising the selected accessory image on the intended recipient of the accessory, evaluating the composite image, and purchasing the accessory in the selected accessory image. Preferably, the purchase is made electronically.

These, and other embodiments of the invention are described in more detail below.

Embodiments of the invention have many advantages. For example, in embodiments of the invention, composite images of a selected accessory on an intended recipient can be manipulated electronically so that a customer can quickly and accurately evaluate the desirability of many different accessories on the intended recipient before purchasing the accessory. Consequently, time is saved and the likelihood that the customer will dislike and return the accessory to the seller is reduced.

Moreover, in embodiments of the invention, a customer can preview and purchase accessories from any suitable location including a kiosk or the customer's home. A customer may also preview, in a pressure-free environment, as many accessories as he or she wishes before purchasing the accessory. Accordingly, embodiments of the invention are more convenient to a customer than conventional purchasing processes.

BRIEF DESCRIPTION OF THE DRAWINGS

Embodiments of the invention can be described more clearly with reference to the following Figures. The following Figures are used for illustration purposes and are not intended to limit the invention.

Figure 7:
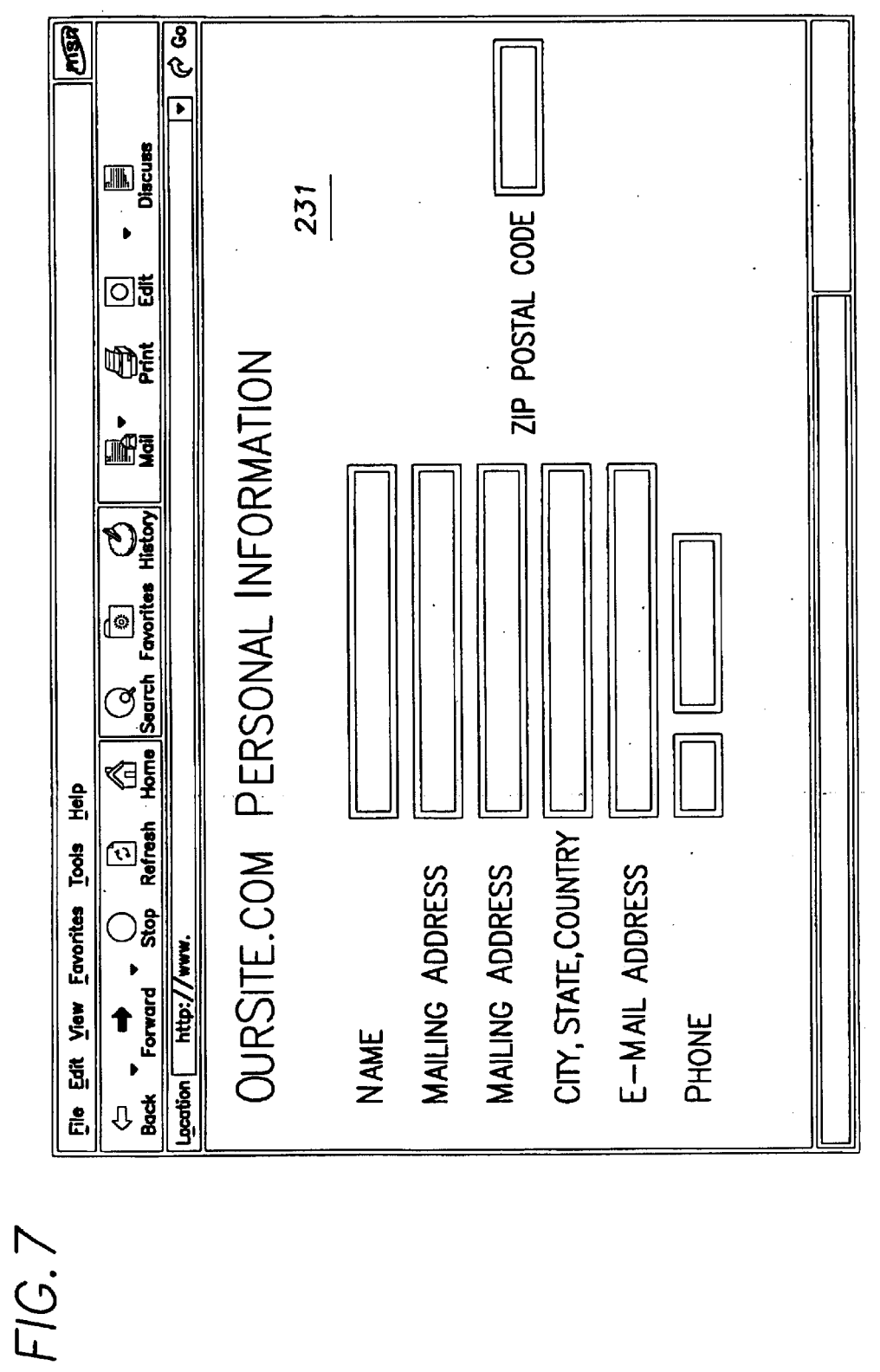

FIG. 7 shows a display screen for entering personal information:

FIG. 8 shows a display screen showing an input screen for, a user.

DETAILED DESCRIPTION

Figure 1:
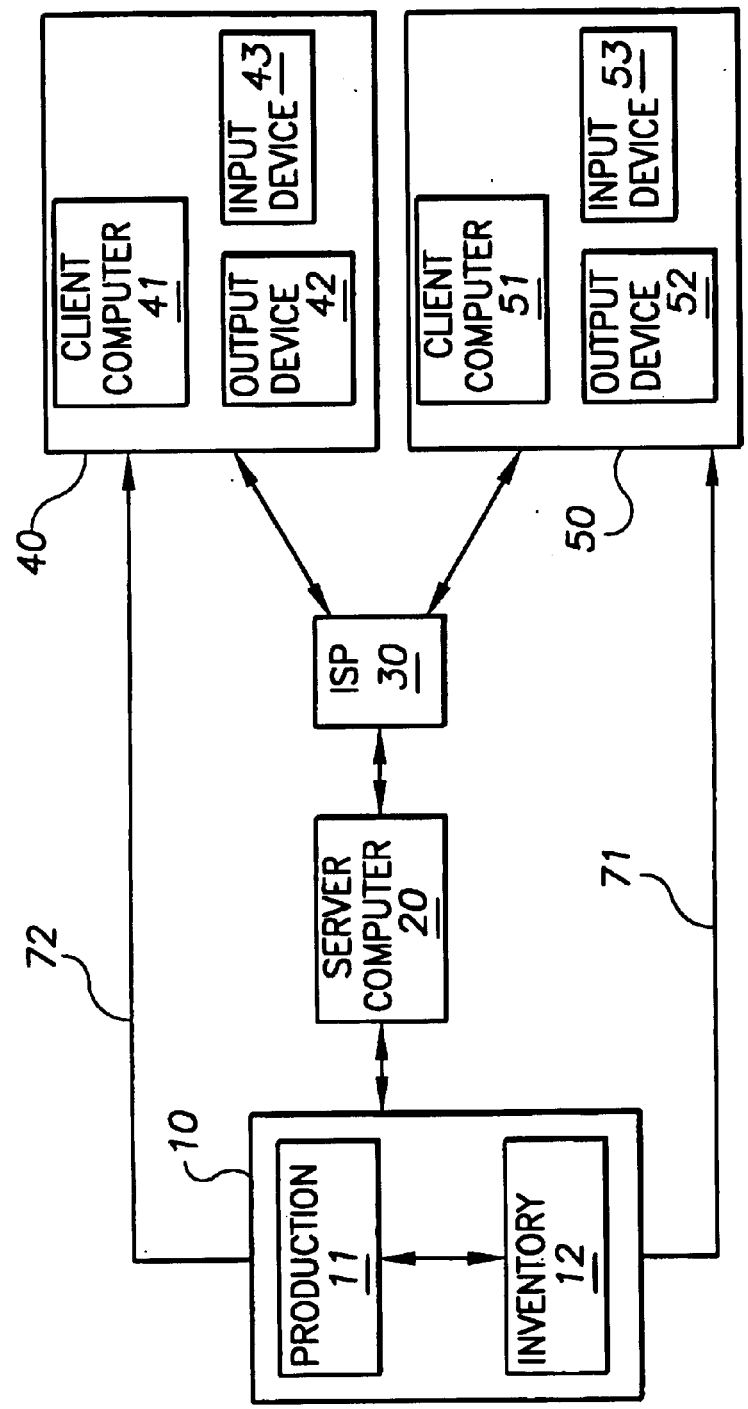
FIG. 1 shows a block diagram of a previewing system according to an embodiment of the invention.
Figure 2:
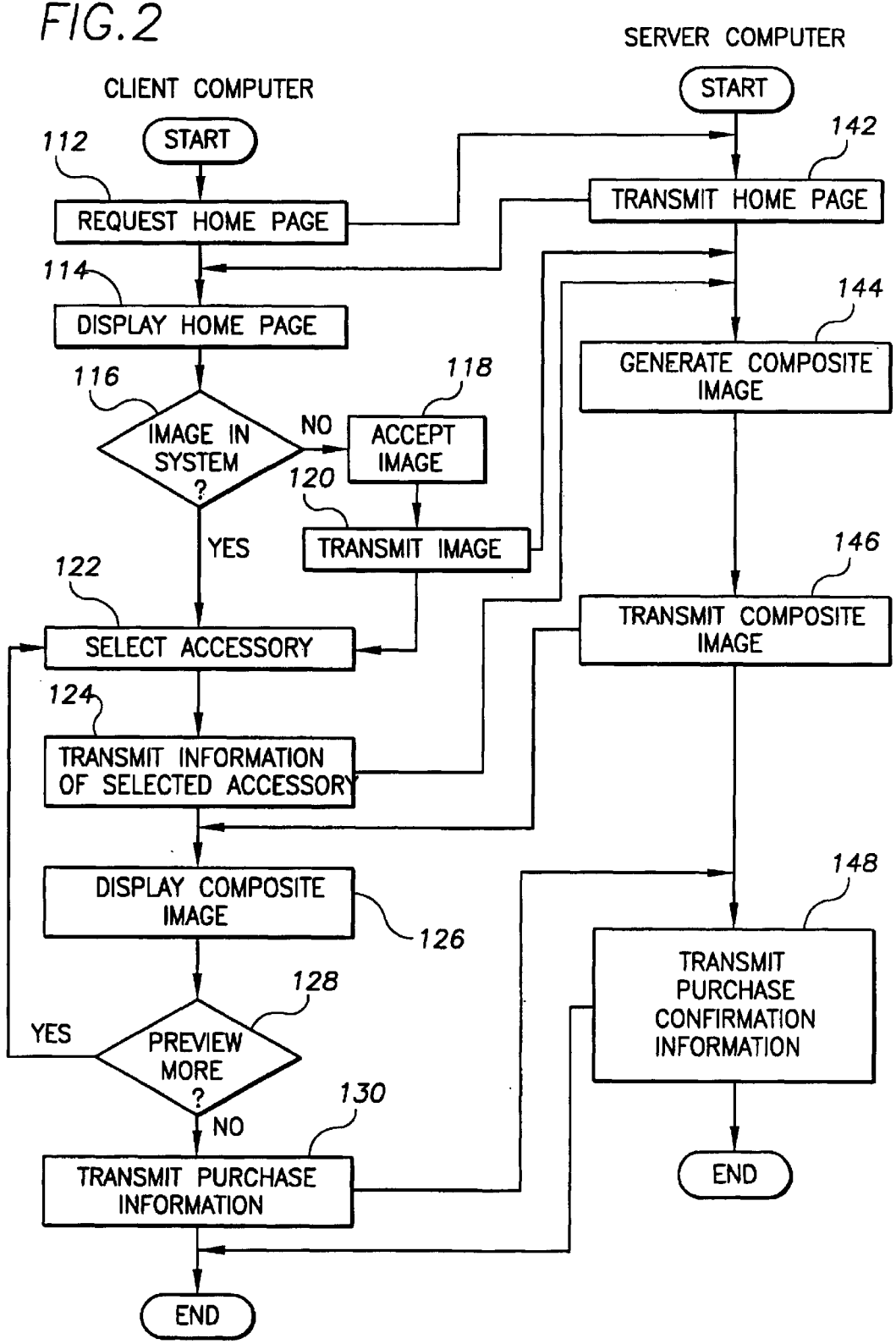
FIG. 2 shows a flowchart representing a method according to an embodiment of the invention.

In embodiments of the invention, the intended recipient of the accessory may or may not be the customer previewing the accessory. For example, a man may want to preview how a particular necklace would look on his wife before purchasing the necklace. At the man's home or at any other suitable location, the man can view a composite image of the necklace on his wife on a display screen. By doing so, he can determine whether the necklace suitably complements his wife's appearance before buying the necklace. Advantageously, this reduces the amount of "guessing" which can sometimes occur when giving accessories as gifts.

Any suitable accessory can be previewed or sold according to embodiments of the invention. Specific examples of suitable accessories include cosmetics (e.g., lipstick, foundation, eyeliner), scarves, ties, purses, jewelry (e.g., watches, necklaces, rings, earrings, pins), eyewear such as sunglasses or prescription ophthalmic glasses (i.e., prescription eyeglasses), and hats. Especially suitable accessories include those which adorn the head of a person. In preferred embodiments of the invention, the accessories are easily attached and removed from a person's body or clothes. More preferably, the accessories are sunglasses or prescription glasses. Accessories can be conveniently purchased using embodiments of the invention. For example, a customer seeking to purchase accessories can do so from any suitable place, not just at stores selling the accessories. In embodiments of the invention, accessories can be previewed and then purchased from the customer's home or at a kiosk. In preferred embodiments, accessories can be purchased at any location accessible to the Internet. For instance, a customer can purchase accessories at the home, business office, school or at any other location accessible to the Internet.

It is especially advantageous to preview and purchase sunglasses according to embodiments of the invention. Many problems associated with previewing and purchasing sunglasses conventionally are addressed by embodiments of the invention. For example, embodiments of the invention permit a customer to view a composite image of a selected pair of sunglasses on the intended recipient before purchasing the sunglasses. The customer can preview the composite image without shaded sunglass lenses over his or her eyes. Consequently, the composite image viewed by the customer is not shaded, but is representative of the image that will be seen by people who are not wearing sunglasses. Moreover, the customer can view the composite image without smudges, scratches, or labels obscuring the customer's vision. Accordingly, embodiments of the invention are especially useful for previewing and purchasing sunglasses, because clear, unshaded images of the desired accessory on the intended recipient can be viewed by the customer before purchasing the accessory.

In addition to viewing the appearance of the sunglasses on the intended recipient, other embodiments can permit the customer to view the images seen by the intended recipient when wearing the selected sunglasses. For example, after the customer selects a suitable pair of sunglasses, the customer may preview shaded images which might be seen by a person wearing the selected sunglasses. In this regard, a number of background images can be provided by the system so that different shades, colors, or tints provided by different sunglasses can be compared by the customer. The output device viewed by the customer can display a shaded, colored, or tinted background image corresponding to the shade, color, or tint provided by a previewed pair of sunglasses. The background image may comprise an image that the customer might see on a typical day. For example, the background image may show an image of a beach or park with trees. These embodiments are especially desirable if accessories are not present at the purchasing location (e.g., at home), because the customer can thoroughly evaluate the selected sunglasses at any convenient location before purchasing them.

Embodiments of the invention are especially useful for previewing and purchasing prescription (ophthalmic) eyeglasses. In embodiments of the invention, a vision-impaired customer can preview an image of himself or herself wearing a selected pair of eyeglasses without taking off his or her glasses to do so. Furthermore, in embodiments of the invention, the eyeglasses in the image viewed by the customer may optionally display lenses along with the selected frames. Consequently, the customer can accurately preview a selected pair of eyeglass frames on his or her face from any suitable perspective without straining to see what he or she might look like. Depending upon the customer's selection, the eyeglass lenses in the frames can be clear, tinted or shaded. Accordingly, by using embodiments of the invention, the customer can accurately evaluate how a pair of prescription eyeglasses would look on himself or herself before purchasing them. After finding a desired pair of eyeglasses, the eyeglasses can be purchased, and then shipped to the customer's home or other location. If adjustment of the received eyeglasses is desired, the customer can visit a commercial store capable of adjusting the eyeglasses for the customer.

In the system illustrated in FIG. 1, accessories can be purchased or previewed at a suitable purchasing location such as a kiosk 40 or at the customer's home 50. Any device which can be at the customer's home 50 can also be at the kiosk 40, or at any other purchasing location.

The kiosk 40 may include any suitable structure and is preferably a stand-alone structure in a publicly accessible place such as a mall, walkway or airport. The kiosk 40 can also be present within a store which sells accessories along with other goods. For example, a kiosk 40 may be present in a store such as a department store. In addition to having a device for displaying accessory images, the kiosk 40 can optionally include accessories for sale. The kiosk can have one or more input devices for receiving an image. For instance, the kiosk can have two or more cameras so that images of the intended recipient from two or more perspectives can be provided to the system. In another example, the kiosk can have one or more scanners in addition to one or more cameras. Providing a plurality of different types of input devices at the kiosk permits customers to, e.g., choose how their images will be provided to the system. Moreover, additional input devices including a voice recognition apparatus, a stylus, keyboard, mouse, touchpad, or touchscreen may be coupled to the client computer so that the customer can input. information such as personal information, accessory selection information, composite image selection information and other information into the system.

The kiosk may further include one or more output devices through which accessory images and composite images can be viewed by the customer or others. For example, the kiosk may have one or more output devices facing the inside and outside of an enclosed kiosk so that people on the outside and inside of the kiosk can see the previewing process taking place. Additionally, the outside of the kiosk may also have one or more input devices so that a person on the outside of the kiosk can interactively preview and purchase accessories. The kiosk can also include one or more client computers which can control any or all of the input and output devices at the kiosk. After previewing accessories at the kiosk, a customer can purchase and obtain a desired accessory from the kiosk to take home. Alternatively, the customer can request that the purchased accessory be shipped to his or her home, or other desired location.

Regardless of whether the purchasing location includes a kiosk 40 or is at the customer's home 50, the purchasing location includes a client computer 41, 51. The client computer 41, 51 can be a stand alone personal computer, workstation or other computational device (e.g., two or more separate computer apparatuses at the same location functioning as a single client computer). Preferably, the client computer 41, 51 includes a browser so that the client computer 41, 51 can contact and interact with the seller's Web site and direct the output device 42, 52 to display the Web site of the seller. Examples of suitable browsers include Netscape Navigatorm and Microsoft Internet Explorer™. In this regard, the client computer 41, 51 is also capable of generating and transmitting data of images to and from the output device 42, 52..

The output device 42, 52 can be any device suitable for displaying an image. Suitable output devices can include a printer such as a laser printer or ink jet printer. Other output devices can include display devices capable of providing electronic, display screens. Examples of display devices include LCDs, active matrix displays, flat panel displays, and video terminals.

Images displayed on the output device are not limited, and can include accessory images, composite images, images of people, and any text images suitable to facilitate the previewing and subsequent purchase of accessories by the customer. The images can be three-dimensional (3-D) or two dimensional. In some preferred embodiments, the images on the output device can be provided in three dimensions. By providing such images, the customer has a richer previewing experience by previewing a more realistic image of the accessory on the intended recipient. In this regard, the system may also incorporate an output device, such as a holographic display or a virtual reality apparatus (e.g., an apparatus with a virtual reality helmet to be worn by the customer), which presents an actual three-dimensional image (e.g., a holographic image) for the customer to evaluate.

The input device. 43, 53 can include an image capture device such as a scanner, a camera such as a digital camera, or an analog or digital video camera. Preferably, the input device 43, 53 includes a digital image capture device such as a digital camera.

In embodiments of the invention, the input device, the output device, and the client computer are preferably at the same location. For instance, the.input device, output device and the client computer can be at a first location such as an office, home, or kiosk, while the server computer can be at a second location such as an Internet service provider or the seller's facilities. In a typical example, the client computer, input device and output device are located at least about one mile from the server computer 20. In other embodiments, an input device is operatively coupled to a first client computer at a first location, a server computer can be at a second location, and a second client computer is operatively coupled to an output device at a third location. In this example, an image may be provided to the input device at the first location and displayed on the output device at the third location.

The input device 43, 53 and the output device 42, 52 are each preferably operatively coupled to a client computer 41, 51 so that the client computer 41, 51 can control both the input device 43, 53 and the output device 42, 52. For example, the client computer 41, 51 can direct or activate the input device 43, 53 to capture the image of at least a portion of the intended recipient. After capturing the image of the intended recipient, the input device 43, 53 or the client computer 41, 51 can transform the captured image into data suitable for transmission over data networks such as the Internet. For instance, the data can be in the form of a data file. Suitable file formats include standard graphics files (e.g., a JPEG or GIF file) or vector graphics files (e.g., HP/GL files). The client computer 41, 51 can also direct the output device 42, 52 to display a composite image generated from data of the composite image. In addition, the input device, output device, and computer can be present in the same or different housing in any suitable combination.

A payment device (not shown) capable of processing the sale of the accessory can optionally be coupled to the client computer 41, 51. Suitable payment devices include a cash register and a card reader such as a credit or debit card reader. By providing a payment device, payment can be made in the manner desired by the customer (e.g. cash, credit, or check) at the purchasing location. Other embodiments need not include a payment device. For example, the seller's Web site may display the address of the seller so that the customer can pay for the desired accessory by mail. Alternatively or additionally, the seller's Web site can provide an interactive ordering form for the customer to fill out with payment information to subsequently transmit to the seller.

Whether or not a payment device is used with the client computer 41, 51, the client computer 41, 51 is preferably capable of documenting and/or processing the sale of the accessory. For example, the client computer 41, 51 preferably communicates with, and can be operatively coupled to, a second output device (not shown) such as a printer to provide the customer with a purchase receipt or other purchase information. The purchase receipt can include information such as an identifier (e.g., name, part number) for the accessory purchased, the cost of the accessory, any applicable sales tax, and the total cost to the customer. Alternatively or additionally, purchase confirmation information such as this may be sent to the customer'shome (or other suitable location) via mail or e-mail.

The purchase information can also be transmitted from the client computer 41, 51 to the server computer 20. In addition to other functions, the server computer 20 can record, transmit, or process information of the sales from any or all client computers 41, 51 in communication with the server computer 20. This provides a seller with updated information regarding the types of accessories which are selling well and where they are being sold.

One or more client computers 41, 51 can be in communication with the server computer 20 via a computer network such as the Internet. The server computer 20 can be located at the seller's facilities or at another location such as at a second ISP (not shown) used by the seller. The client computers 41, 51 can communicate with the server computer 20 by first contacting an Internet service provider (ISP) 30 or other entity, thus providing the client computers. 41, 51 with access to the Internet, and in particular the World Wide Web. The server computer 20 can then be contacted by the client computer 41, 51 by providing the appropriate information (e.g., a Web site address) to the client computer 41, 51.

The server computer 20 is typically a powerful computer or cluster of computers. For example, the server computer 20 can be a large mainframe, a minicomputer cluster, or a group of servers functioning as a unit. For instance, the server computer may be a database server coupled to a Web server. Moreover, the server computer 20 can behave as a single computer which services the requests of one or more client computers. The server computer 20 can retrieve selected accessories from an information storage medium on or accessible to the server computer 20. In addition, the server computer can generate composite images from accessory image data and data of the intended recipient's image. Client computers, such as the client computers 41, 51 shown in FIG. 1 can communicate with the server computer 20 through the Internet and optionally through one or more ISPs. The client computers 41, 51 typically have less memory and less computing power than the server computer 20.

Generating composite images with a server computer and retrieving accessory images with the server computer 20 from an information storage medium operated by the seller is highly advantageous. First, since a server computer has more computing power than a typical client computer, a server computer is better suited to quickly manipulate large data-containing files, such as those containing accessory image data, than a typical client computer. Accessory image data and human image data are typically in the form of graphics files, which often have much more data than files such as text files. Moreover, since the server computer is more powerful than the client computer, other image manipulation processes are performed much faster on a server computer than a client computer. For example, a server computer generates side-by-side composite images more quickly than a client computer. Because data manipulation is much faster with the server computer, the customer is provided with a substantially real-time interactive experience when previewing and purchasing accessories. Second, by using a server to generate and manipulate images, specialized software need not be provided to each client computer. For instance, specialized image manipulation software need not be purchased and loaded on each home computer, office computer, kiosk computer, etc. in order for one to preview accessory or composite images. In embodiments of the invention, client computers use a standard browser or other standard computer program for previewing and/or purchasing to take place. Since special software need not be provided on the client computers to use the system, many potential customers can access the seller's Web site to preview and purchase accessories. The increase in the number of potential customers can lead to an increase in accessory sales. Third, since the composite images are generated by a server computer and accessory images are stored on an information storage medium on or accessible to the server computer, large data-containing graphics files of accessory images need not be provided to the client computers for manipulation or storage. Providing accessory image data to a client computer for manipulation and storage can be time consuming. For example, because accessory image files contain large amounts of data, downloading or transferring a large number of such files to a client computer can take a long time. In embodiments of the invention, such lengthy data downloads and transfers are not needed. Lastly, by generating composite images at the server computer and by storing accessory images at a location on or accessible to the server computer, powerful computers having high storage capacities need not be provided at each individual purchasing location. Since less powerful computers can be present at each purchasing location, the costs of the system can be minimized and the system is more accessible.

The system, and especially the server computer 20, can include one or more computer programs, written in any suitable computer code, to facilitate accessory previewing, accessory purchasing, or any other function described herein. For example, first, second, and third computer programs used for performing three different functions can be embodied in a single computer program having one or more subroutines, or may be embodied by three separate and distinct computer programs. In embodiments of the invention, for instance, the server computer 20 may have a computer program for selecting an accessory image or an image of at least a portion of a person from an electronic database of images and a computer program for generating data of a composite image from this data. Preferably, the server computer 20 also includes a computer program for selecting images such as a background image from an electronic database. A composite image can then be generated with a program using data of the background image, the accessory image, and the captured image of the intended recipient. A computer program for providing shaded images corresponding to the shaded, colored, or tinted images seen by the person wearing the selected sunglasses can also be provided. Additionally, a computer program for saving and retrieving favorable composite images to and from an information storage medium for display can also be provided. Moreover, the server computer 20 can also have one or more computer programs for performing, documenting, or transmitting the information of, the sale of an accessory.

In preferred embodiments, the server computer 20 may run or contain data of a Web site. The Web site may have one or more Web pages having an index, order forms, accessory images, composite images, invoices, and help pages. The Web pages of the seller's Web site may include any number of interactive features including any suitable number of hyperlinks to help guide the customer through the Web site. A browser on the client computer 41, 51 in communication with the server computer 20 permits the customer to view the seller's Web site and pages thereof on the display device 42, 52 coupled to the client computer 41, 51.

The server computer 20 may also include or have access to an information storage medium. The information storage medium can store data permanently or temporarily. Examples of information storage media include magnetic, electromagnetic, optical tapes and disks.

The information storage medium may have one or more electronic databases. The databases can include accessory images, images of accessory components (e.g. lenses), images of models who look like the intended recipient, images of the intended recipient (e.g., customers), background images, personal information of customers who have previously visited the seller's Web site, and other customer purchase information. Further, two or more databases with different types of accessories may also be provided on the information storage medium. The information storage medium can also be used to store favorable composite images saved by the customer. In preferred embodiments, personal images and personal demographic information are present in one or more databases which are separate from databases having the financial information of customers (e.g., credit card numbers). This may be done to enhance the security of the system.

Storing accessory images on an information storage medium is advantageous. For example, since any suitable accessory can be previewed electronically, accessories need not be provided at the point of sale. Consequently the retail space needed to sell the accessories can be reduced, thus reducing operating costs. Moreover, since accessory images are stored electronically in embodiments of the invention, many more accessories can be presented to the customer than if the customer was at a store selling accessories. The number of accessories displayed in a store is limited by the amount of physical space provided for display.

Also, providing the information storage medium on the server computer provides other advantages. For example, a storage medium on a typical server computer generally has more storage capacity than a typical client computer. Consequently, it is more advantageous to store accessory image data on the server computer, than on a client computer, because more accessory images can be stored and subsequently presented to the customer for review. In addition, if new accessories are made available by the seller, the database of accessory images on the information storage medium can be rapidly updated by the seller so that the customer is offered.the most current accessories available. If, for example, the accessory images are stored on many client computers, updating accessory information on the client computers can be difficult and untimely as continuous downloads or transfers of information are likely to be needed to keep the list of available accessories current.

The system may also include one or more firewalls (not shown). In the system, a firewall can be present between a client computer and the server computer to limit the access to predetermined portions of the seller's Web site to a predetermined set of visitors. For example, the seller may restrict the access to the Web site to visitors who want to purchase accessories or who have registered for specific services, e.g., a mailing list, promotions, etc. Access to pages of the seller's Web site may be granted to visitors providing identification information such as a PIN (personal identification number) number, a fingerprint, electronic signature or a password to the system. The visitors may provide the identification information to an input device such as a biosensor (e.g., for receiving fingerprints), a keyboard, or an electronic stylus (e.g., an electronic pad for receiving an electronic signature. The system may also include another firewall which can limit visitors' ability to access the information storage medium containing the database of images and personal information of past customers. By providing this firewall, unauthorized persons will not be able to access the database of images and personal information of the seller's customers. In this regard, the system can have one or more firewalls separating one or more databases.

In a typical example of firewall usage, the server computer may comprise one or more database servers and one or more Web servers. The database servers may include an information storage medium which contains the images of people such as past users (e.g., customers) of the system along with their personal information (e.g., name, address, etc.), while the Web servers contain the Web site of the seller. A firewall present between the database server and the Web server prevents visitors who are able to access the seller's Web site from accessing the database servers containing the images and personal information of the seller's customers. By providing one or more firewalls in the system, sensitive information such as the name, image, address, etc. of the seller's customers can be protected.

In embodiments of the invention, an Internet service provider (ISP) 30 can provide the client computers 41, 51 with access to the Internet. Alternatively, the client computers 41, 51, and/or the server computer 20 can access the Internet without using an intermediate ISP. Because the Internet can be used to transmit purchase information and images between the server computer 20 and the client computers 41, 51, the server computer 20 may be remotely located with respect to the client computers 41, 51. In a typical example, the client computers 41, 51 are located at least about one mile from the server computer 20.

The seller 10 may have a production facility 11 for producing accessories and an inventory facility 12 for storing.accessories. Customer orders can be sent to the seller's production facility 11 or inventory facility 12 via the Internet. After producing or retrieving the desired accessory, the desired accessory can be shipped to the customer'shouse 50 or the kiosk 40 using a parcel carrier 71, 72 including the U.S. Postal Service or any overnight carrier.

Other embodiments of the invention can be described with reference to FIGS. 2 to 16.

A customer at a purchasing location (such as at a kiosk or at home) can use a client computer to contact a Web site located on a server computer operated by the seller. The client computer can be manually or automatically instructed to request the seller's home page 112 . For example, a customer at the client computer can dial up an ISP so that the client computer can access the Internet. Then, the customer can provide the Web site address of the accessory seller to the client computer via an input device, so that contact can be made with the seller's Web site. If the client computer is located at a kiosk operated by the seller, the client computer is preferably in regular communication with the seller's Web site. For example, the output device at the kiosk can continuously display the seller's Web site.

After receiving the home page request from the client computer, the server computer can transmit the home page 142 or data thereof to the client computer via the Internet. After receiving the home page from the server computer, the client computer can direct an output device coupled to the client computer to display the home page 1 14 of the seller to the customer.

Figure 3:
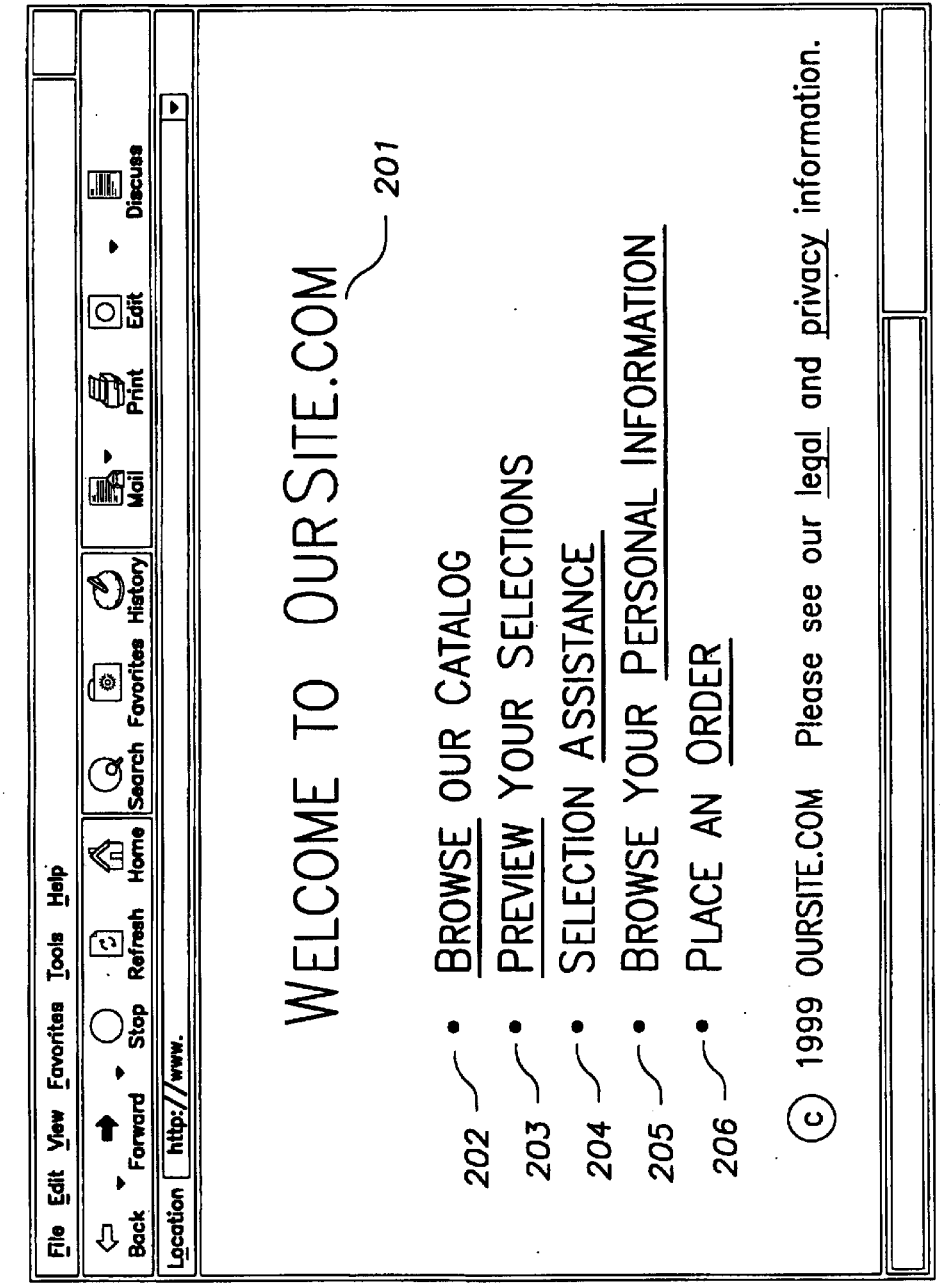
FIG. 3 shows a display screen with an index.
Figure 4:
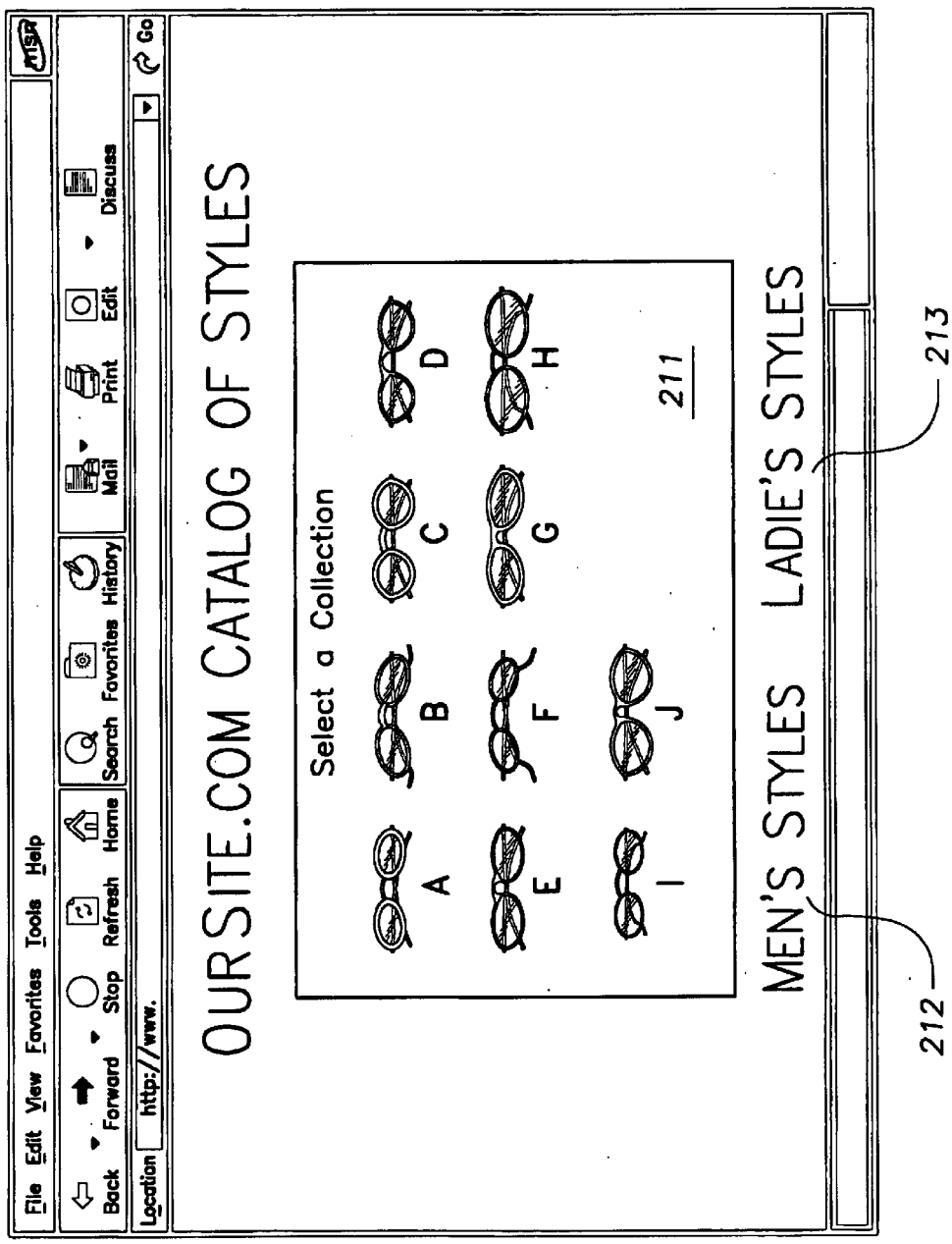
FIG. 4 shows a display screen displaying sunglasses.
Figure 15:
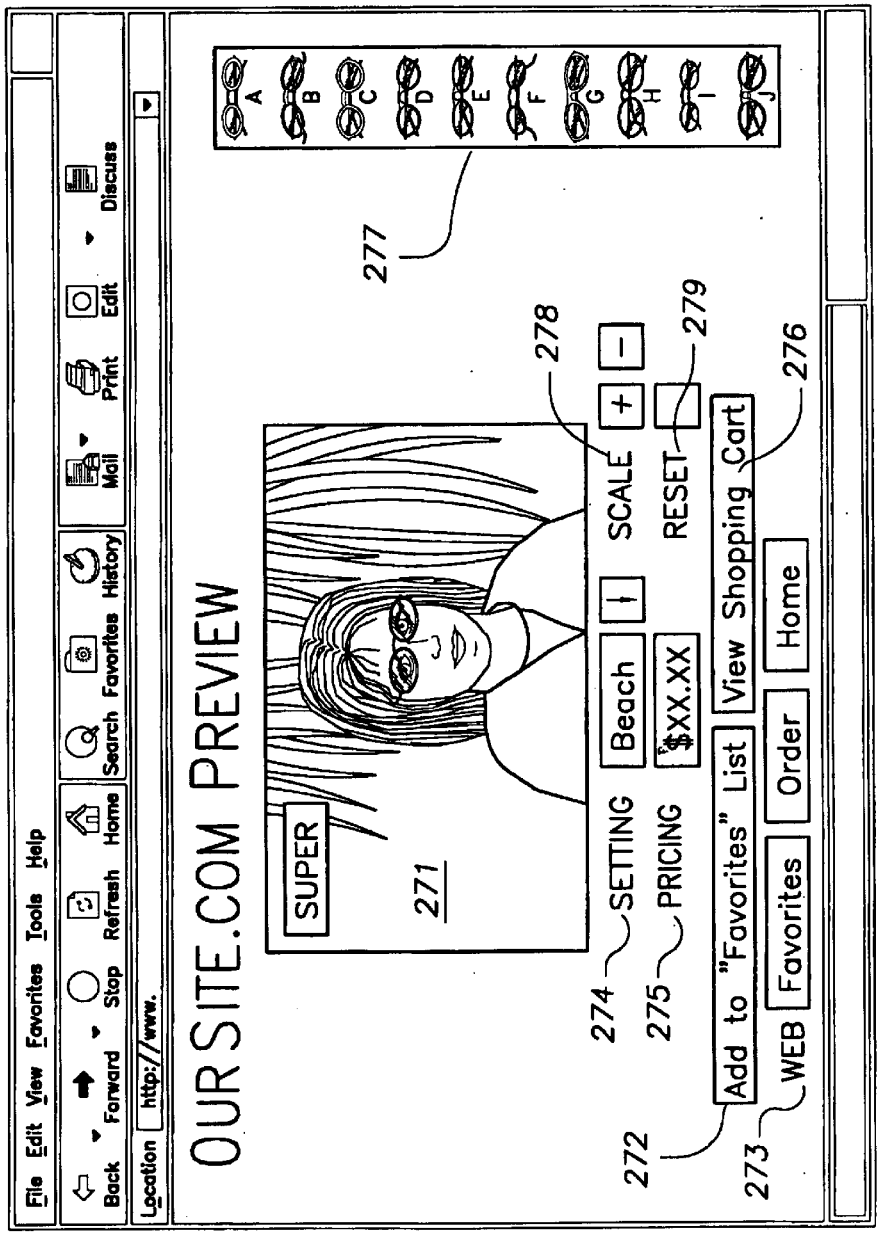
FIGS. 15 and 16 show display screens according to embodiments of the invention.

An exemplary home page is shown in FIG. 3. Preferably, in addition to displaying the name of the seller 201, the displayed home page or other Web pages on the seller's Web site may include an index such as the one shown in FIG. 3. The home page may include any suitable images and may also include the seller's Web site address. The index can include any. suitable number of hyperlinks to guide the customer through the seller's Web site. For example, as shown in FIG. 3, the index of the seller's Web site can include hyperlinks which permit a customer to browse the seller's catalog of accessories 202, preview selected accessories 203, obtain automated or manual assistance in selecting suitable accessories 204, browse personal information previously provided to the system 205, and place an order for, or purchase, one or more accessories 206. Additionally, a hyperlink for viewing an electronic shopping cart (not shown) can be in the display screen. In other embodiments, the hyperlink for previewing selected accessories 203 need not be displayed in the index. For example, a customer can select the hyperlink to browse accessories 202 so that a display screen such as the one shown in FIG. 15 is displayed. The accessory images 277 may be hyperlinks to other accessory images having similar characteristics (e.g., the same style, color, etc.). After an accessory image is selected for previewing, a composite image can be generated.

After the customer contacts the seller's Web site, the customer can browse the electronic electronic accessory catalog on the seller's Web site. For example, FIG.,4 shows a display screen on a Web display screen on a Web page. The Web page has plural images of sunglasses 211. Each sunglass image can represent a different collection of sunglasses. The customer viewing the display screen shown in FIG. 4 can select one or more of the sunglass images to display plural sunglass images having the same style, type, or size as the selected sunglass image. In this regard, each of the sunglass images can be a hyperlink to other Web pages having more sunglass images of the same style, type, or size as the selected sunglass image. Alternatively, the sunglass images shown in FIG. 4 can be selected for previewing on the intended recipient. The customer can also browse through the men's or women's sunglass images for sale by the seller. For example, the customer can select the the hyperlink "Men's Styles" or the hyperlink "Ladies' Styles" to request one or more Web pages respectively showing or highlighting men's or women's sunglass styles for browsing or viewing by the customer.

Figure 5:
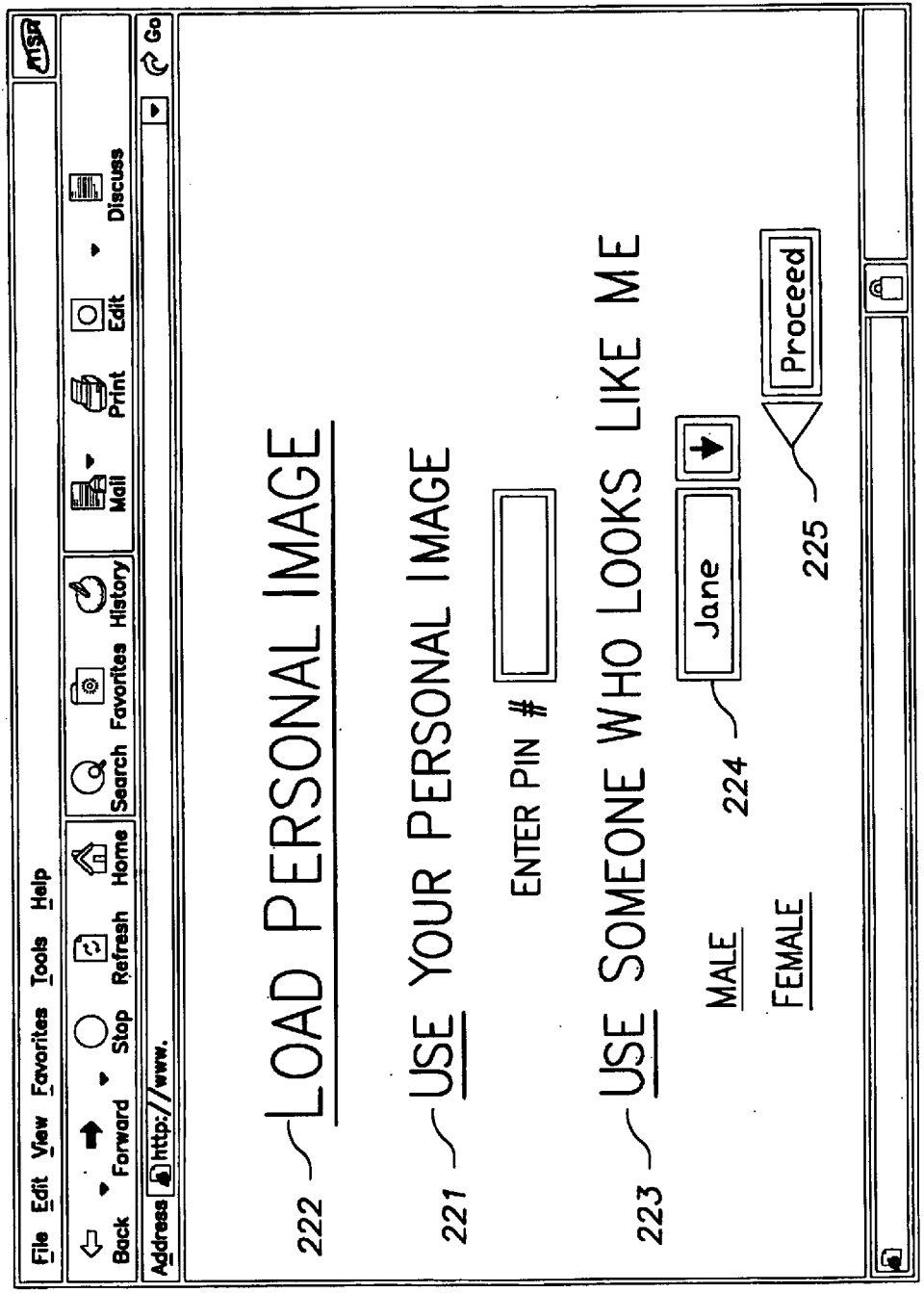
FIG. 5 shows a display screen for loading or retrieving an image.

After evaluating one or more accessory images in the catalog, the customer can preview how the selected accessories would appear on the intended recipient or a human model who has an appearance similar to that of the intended recipient. Preferably, the image of the intended recipient is used. For example, the display screen shown in FIG. 5 provides three selectable options for the customer. By selecting the appropriate hyperlink or button, the customer can load an image of the intended recipient 222, use an image of the intended recipient that is already stored on the system 221, or use an image of a model having an appearance similar to the intended recipient's appearance 223 for previewing accessories.

In embodiments of the invention, the customer need not provide an image of the intended recipient to the system. For example, a customer may be apprehensive about providing his or her image and/or personal information to the system for fear that this information could be improperly obtained by unauthorized persons if sent to the seller. Thus, embodiments of the invention permit a customer to preview accessories using an image of a male or female model who has an appearance similar to the intended recipient. With reference to FIG. 5, these images can be retrieved from the information storage medium by scrolling down a list of names of available models 224, selecting the name of a model that has an appearance similar to the intended recipient's appearance, and then selecting the "proceed" button 225. shown in the display screen. Alternatively, the "male" or "female" hyperlink can be selected so that the available model images can be viewed. The data representing images of models can be present in a database in the system's information storage medium.

The image of the intended recipient can also be retrieved from an information storage medium, which is on or accessible to the server computer for previewing. The image of the intended recipient may have been saved on the information storage medium from the customer's past interaction with the seller's Web site. Accordingly, embodiments of the invention also provide for an information storage medium having the images of previous users of the system (e.g., the seller's customers). For security reasons, the retrieval of the image of the intended recipient may be permitted after the customer provides an identifier such as a PIN number to the system. Advantageously, in these embodiments, the customer need not re-input the image of the intended recipient into the system every time accessories are previewed.

Figure 9:
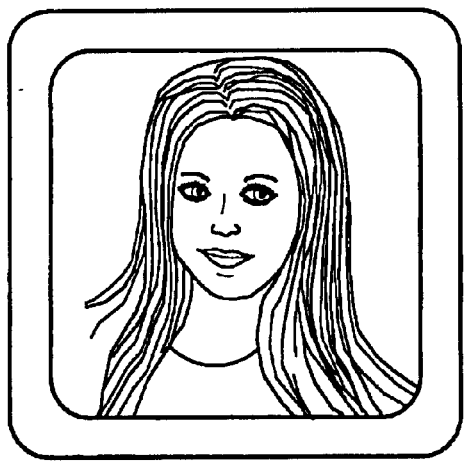
FIG. 9 shows an image of a person.

If the image of the intended recipient is not in the system 116, or if the customer wants to preview the accessory images with other different images of the intended recipient, the customer can provide one or more images of the intended recipient to the system 118 and in particular, to the server computer. The provided image may include an image of any desired portion or portions of the intended recipient of the accessory including the head, neck, or the entire body of the intended recipient. For example, if sunglasses are previewed, then an image of the head of the intended recipient may be provided to the input device. An example of such an image is shown in FIG. 9 which shows an image of an intended recipient of an accessory. A customer may want to provide more than one image of the intended recipient so that images of the intended recipient in different poses, clothes, hairstyles, etc. can be viewed along with one or more selected accessory images.

Figure 6:
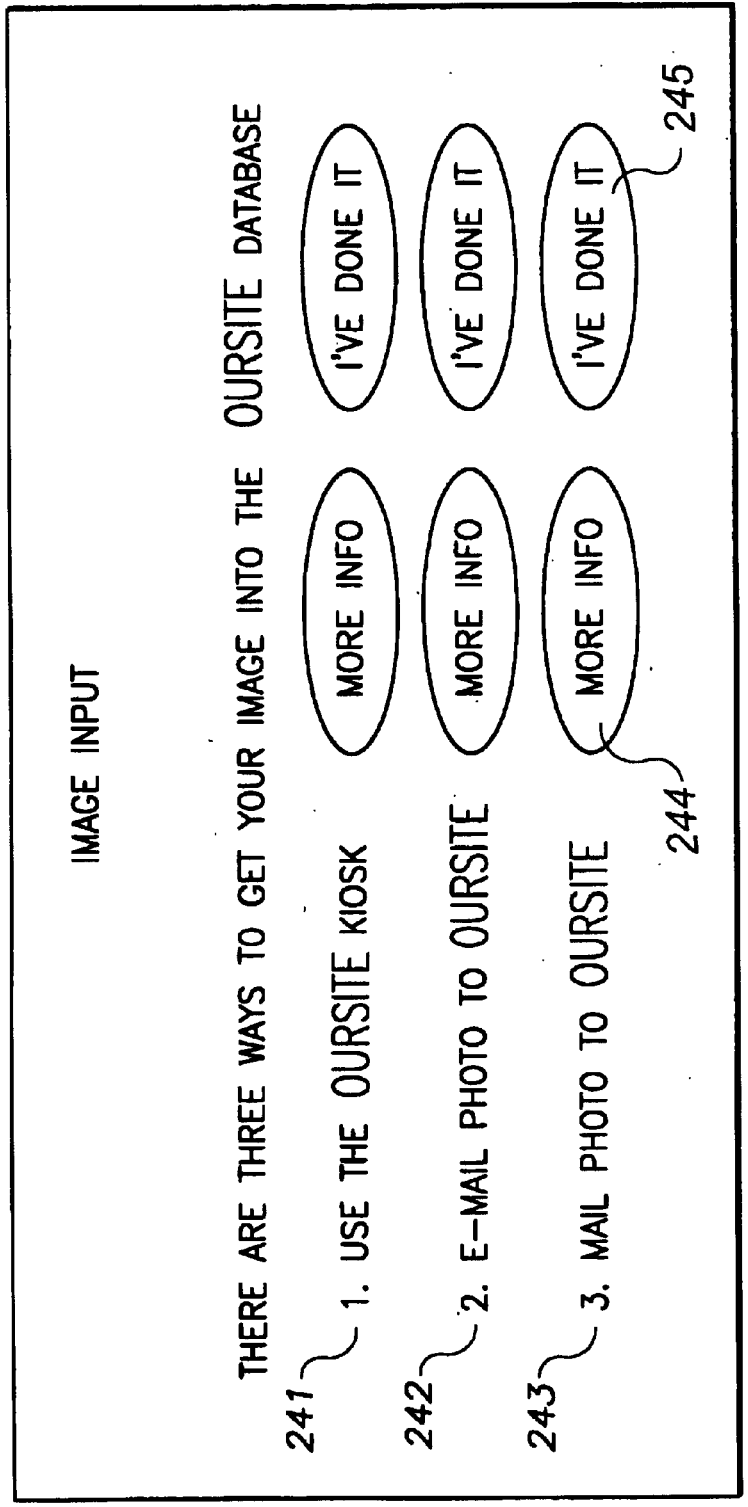
FIG. 6 shows a display screen having options for providing an image.

The image of the intended recipient can be provided to the system in any suitable manner. For example, the display screen shown in FIG. 6 provides three options for the customer. If the customer is at a kiosk. the customer can provide the image of the intended recipient to an input device at the kiosk 241 so that data of the image can be transmitted to the server computer. The customer may also e-mail 242 or mail 243 the image of the intended recipient to the seller so that the seller can provide the image to the system and then to the server computer. If the customer has already completed one or more of these tasks. the "I've done that" button 245 can be selected to inform the seller that the task has been completed. The customer may also request more information about the image providing process by selecting the "more info" button 244.

In preferred embodiments, the intended recipient's image is provided to the system via an input device before being sent to the server. This is done with any suitable process. For example, the first image may be provided to the input device by scanning an image of the intended recipient into the input device with a scanner. This may be desirable if, e.g., the accessory to be purchased is to be given as a gift to another person, because the intended recipient need not be present at the time of purchase. In this case, the intended recipient is preferably not the customer.. Preferably, the first image is provided to the input device by taking a picture of the intended recipient with an image capture device such as a digital camera. By doing so, interested customers can preview and purchase sunglasses without carrying a picture of themselves or others with them. Most often, the intended recipient is also the customer in this situation. The captured image is transformed into data of the intended recipient's image with a client computer in communication with the input device, and then transmitted to the server computer 120. Regardless of how the first image is. provided to the input device, the first image is preferably transmitted to and from the client computer as data of the first image.

Before or after an image of the intended recipient or other person is provided to the system, the customer may enter personal information into the system. A display screen showing a form to be filled out can be provided for the customer to fill in. For example, the display screen shown in FIG. 7 includes a form 231 with blanks for the name of an individual (e.g., the customer), a mailing address, e-mail address, and phone number. After the customer provides the requested information, this information can be sent to the seller's Web site. This.information can be used by the seller, for example, to confirm accessory orders and contact the customer if there is a problem in shipping one of the customer'spurchases.

If desired, after the customer'spersonal information is provided to the system, the seller's Web site can provide a PIN number to the customer so that the customer can access the seller's Web site and/or retrieve previously provided images for previewing selected accessories. As explained above, a customer can use previously provided images and need not provide images of the intended recipient each time the seller's Web site is accessed and each time accessories are previewed. Embodiments which grant visitors access to the seller's Web site or portions thereof in response to a provided PIN number (or other identification information) have added security. An exemplary form 251 for providing a PIN number is shown in FIG. 8.

Also, since personal information and personal images are present on the seller's Web site, it is also desirable to provide one or more firewalls between the client computer and the server computer. For example, as explained previously, a firewall can be present between the seller's Web site, and the database which includes the stored personal information and images of customers. By doing so, visitors viewing the seller's Web site cannot access the database of personal information and personal images of customers. Consequently, these embodiments also provide added security.

After or before the intended recipient's image (or an image of someone who looks like the intended recipient) is provided to the system, the customer can select one or more accessory images 122 to preview on the intended recipient. The accessory images can be displayed to the customer on a display screen with or without composite images generated by the system. The customer may select one or more of these images with a second input device coupled to the client computer. The second input device may be, for example, a mouse, keyboard, touchpad, touchscreen, stylus, trackball, etc. The second input device may also comprise a voice recognition apparatus which can permit a customer to provide selection and other information to the system by speaking or providing audible sounds. The selection of accessory images may also be performed automatically. Information of the selected accessory image and data of the image of the intended recipient may be received by the client computer. This information is then transmitted 124 to the server computer preferably via the Internet.

In preferred embodiments, accessory images suitable for the intended recipient are displayed to the customer in response to the image of the intended recipient provided to the system or in response to entered data (e.g., interpupil distance, waist size, head size, etc.). The data may be entered manually or automatically. For example, an input device can capture a first image including the image the intended recipient. After the captured first image is transformed into data, the client computer can then transmit the data to the server computer via the Internet. The server computer can analyze the data of the first image and then determine which accessories will be suitable for the intended recipient. For example, the server computer can analyze data of the input image of the face of the intended recipient. If a pair of sunglasses or eyeglasses is the desired accessory, then the interpupil distance and/or the width of the recipient's head can be automatically determined from the data of the image of the recipient's head. In other embodiments, this information (e.g., interpupil distance) can be manually input into the system by the customer (e.g., via an input screen on the seller's Web site) or may be sent by mail or e-mail to the seller.

With the information of the intended recipient's body parameters, the server computer automatically selects images of sunglasses which are suitable for the intended recipient. Data of the selected sunglass or eyeglasses images are retrieved from a database and are then transmitted to the client computer. The client computer then directs the output device to display images of the accessories found. Preferably, unsuitable pairs of sunglasses or eyeglasses (e.g., ones which would be too small for the intended recipient) are not displayed. The customer can then preview the presented sunglass or eyeglasses images by selecting one of more of the displayed suitable accessories so that a composite image can be generated for previewing by the customer. Advantageously, purchasing accessories in this manner is faster than traditional purchasing processes. By using information such as data of the intended recipient's body parameters to help select accessories, the accessories which are suitable for the intended recipient can be displayed as images for the customer to select and preview. The customer does not waste time previewing the images of accessories which would be unsuitable for the intended recipient, as may be the case in traditional purchasing processes.

After receiving information of the selected accessory image, the server computer can retrieve the selected accessories or data thereof from the electronic database of accessory images. Once received, the data of the first and second images are manipulated to generate data of a composite image 144 showing the accessory on the intended recipient. In preferred embodiments, the server computer generates data of a composite image from the data of the first image of the intended recipient and data of the second image of the selected accessory. This can be done in any suitable manner.

In an illustrative example, a composite image and data thereof can be generated by permitting a customer to manipulate displayed images of the intended recipient and an accessory. For example, a customer can select (e.g., by clicking) an accessory such as a decorative pin from a displayed catalog of pins. After the selection is made, the customer can drag the image of the decorative pin (or other accessory) onto the image of the intended recipient, thus electronically generating a composite image. The customer can adjust the position of the accessory as desired for previewing. In other embodiments, a composite image can be automatically displayed to the customer simply by selecting the particular accessory of interest. Once generated, the data of the composite image is transmitted to the client computer 146, and the client computer subsequently directs an output device to display the composite image 126.

Figure 10:
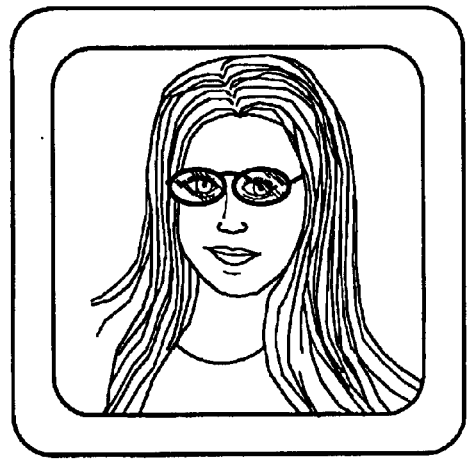
FIG. 10 shows a composite image of a person wearing sunglasses.

The composite image derived from the composite image data can show one or more similar or different accessories on the intended recipient. For instance, if the first image includes an image of the head of the intended recipient and the second image of the selected accessory includes an image of a particular pair of sunglasses, the composite image can show a pair of sunglasses disposed over the eyes of the image of the recipient's head on the intended recipient. Optionally a pair of earrings may be displayed on the intended recipient along with the sunglasses. FIG. 10, for example, shows a composite image generated from the intended recipient's image shown in FIG. 9, and a selected sunglass image.

The data of the first image of the accessory and the data of the second image of the intended recipient can be manipulated in any suitable manner to form a composite image. In preferred embodiments, data of the image of the intended recipient can be manipulated so that the image is modified (e.g., enlarged or reduced) to match the size of templates having a predetermined size. For example, templates corresponding to the shape of the human head can be approximated by a circle, oval, oblong shape, square, or triangle of a predetermined size. The modified image can be compared against one or more templates corresponding to the modified image. Once one or more templates are selected, data of the selected templates can be compared to data of one or more accessory images selected by the customer. The customer can be informed that the selected accessory will or will not be suitable for the intended recipient (e.g., the accessory will or will not fit). If the accessory is acceptable, a composite image is generated. Advantageously, the customer need not worry about providing an image of a predetermined size to the input device. At home, for example, a person need not worry about being too far or too close to a digital camera when providing an image of himself or herself to the system. The system can automatically adjust the provided image so that suitable accessories can be selected for previewing.

Matching templates can also be used to help a customer select suitable accessories for viewing or selection. In embodiments of the invention, one or more templates (or data thereof) can be used to select suitable accessory images or data thereof from an electronic database for the customer to review. For example, if the intended recipient has a round face, sunglass frames with straight or angular lines can play down the roundness of the face. In addition, deep colored frames (e.g., black or tortoise colored frames) also maximize the fullness of a round face. A variety of templates having different shapes can be matched (automatically by the server or manually by the customer) with the intended recipient's round face until the round template is found. After it is determined that the round template corresponds to the intended recipient's face, a number of sunglasses having frames with straight or angular lines, and deep colors can be presented to the customer for viewing or selection.

Figure 11:
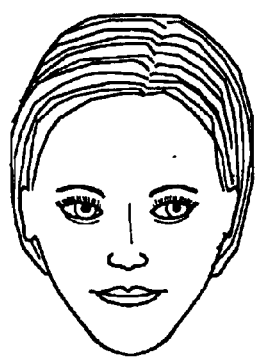
FIG. 11 shows an image of the head of a person.
Figure 12:
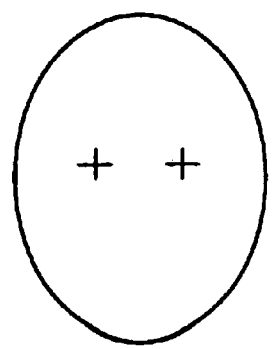
FIG. 12 shows a template for the head of a person.

In another illustration, when sunglasses are to be previewed on the intended recipient, data of a plurality of oblong templates representing the shape of the intended recipient's head can be provided. Data of the first image of the intended recipient's head (e.g., as shown in FIG. 11) can then be modified so that the corresponding image of the recipient's head is reduced or enlarged until it corresponds to the size of the oblong templates. Two crosses (or other indicia) are present within each oblong template to approximate the location of the pupils of a person in an image. The distance between the crosses (i.e., the intercross distance) in each respective oblong template can represent the interpupil distance of the person in the image. Different intercross distances in different templates can represent the different interpupil distances in different people. Oblong templates having different intercross distances can then be compared to the interpupil distance of the intended recipient in the modified image. After obtaining a matching template (e.g., as shown in FIG. 12), the template or data thereof can then be compared against data of the sunglass images in the database. Sunglass images having characteristics (e.g., interpupil distance) matching those of the template can be retrieved, and then displayed to the customer so that she may select one or more sunglasses from this group for previewing.

Figure 13:
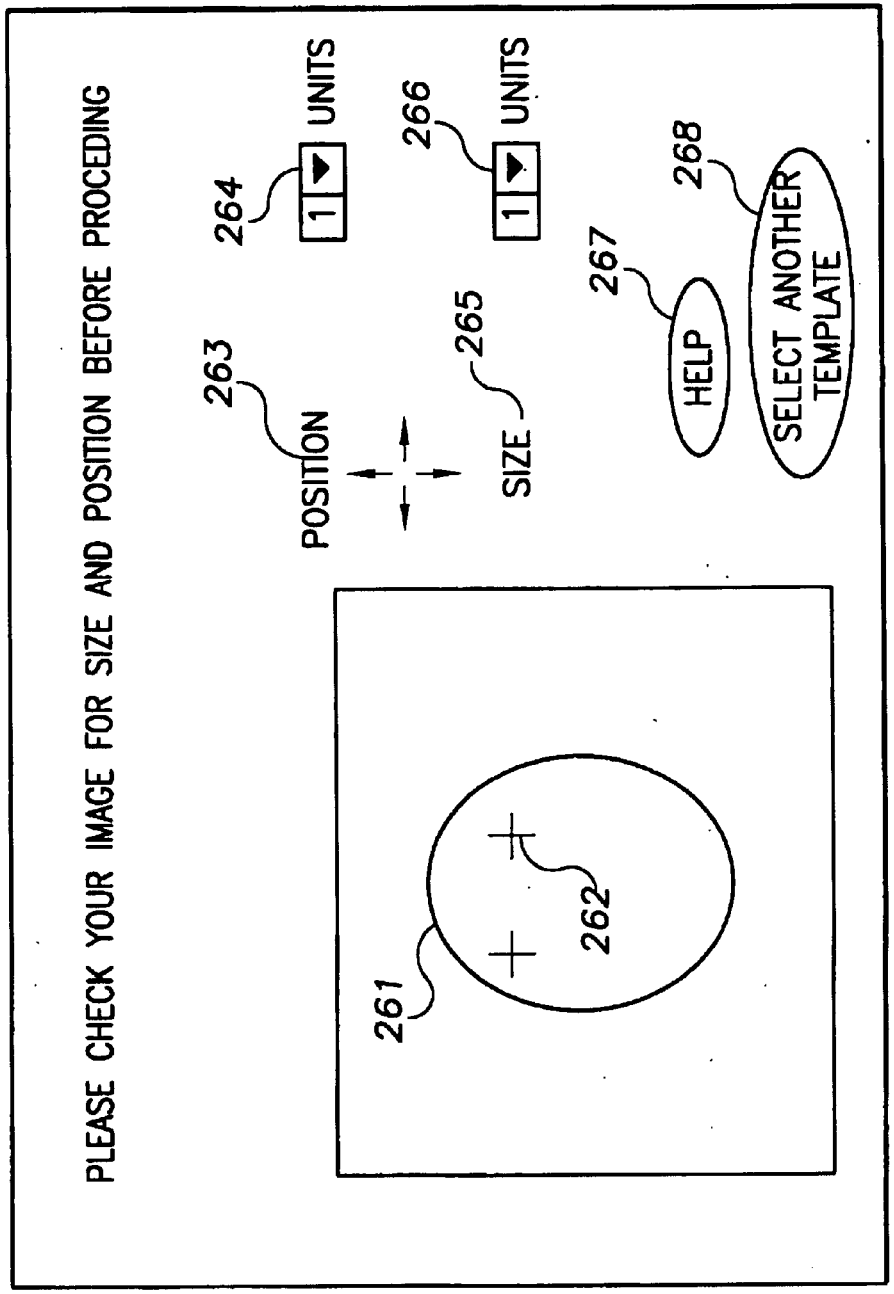
FIG. 13 shows a display screen having an image adjustment mechanism.

While the provided image of the intended recipient can be adjusted automatically to correspond to the template, the provided image of the intended recipient may also be manually adjusted to the size of the intended recipient's image. For example, FIG. 13 shows a template 261 having crosses 262 which can correspond to the pupils on the face of an intended recipient in a provided image. The image of the intended recipient's face can be reduced or enlarged by scaling the inage, e.g., with first and second scaling elements 265, 266 on the Web page. The position of the provided image may also be changed with two or more position elements 263, 264 displayed on the Web page. A "help" button 267 can also be provided on the display to help the customer with the purchasing or previewing process. If correspondence between the template and the modified image is not achieved, then other templates can be presented to and selected by the customer for comparison by selecting the appropriate button 268 on the display screen. After correspondence between the modified image and the template is achieved, suitable sunglasses can be selected for the customer to browse and suitable composite images can be generated.

In other embodiments, instead of using templates, body parameter information (e.g, interpupil distance) of the intended recipient can be manually input by the customer so that accessory images can be selected and composite images can be generated. In this regard, any other suitable information about the intended recipient or the customer can be input (manually or automatically) into the system to facilitate the previewing and purchasing process. Other information which may be provided to the system to facilitate the previewing and purchasing process includes information of the customer's or intended recipient's preferences (e.g. styles, colors, price range), as well as information regarding other characteristics of the customer or intended recipient. For example, if prescription eyeglasses are to be purchased, the customer may input one or more of an interpupil distance and lens preference (e.g., anti-reflective, tinted, shaded, bifocals) into the system. The prescription of the particular lenses may also be input into the system. Input prescription parameters can include, for example, the sphere, cylinder, and axis of the lenses. From this input information, images of the selected eyeglasses with lenses on the intended recipient (e.g., the customer) can be previewed by the customer. The information such as the input prescription and lens preference may also be used by the seller to manufacture the desired eyeglasses which will be delivered to the customer.

Information may be provided to the system in any suitable manner. For example, a display screen can have a blank form for the customer to fill in. Within the blank form, the customer can provide information as to the intended recipient's body parameters such as the intended recipient's interpupil distance, the finger size, waist size, neck size, and personal preferences (e.g., preferred color styles, colors and price range). In other embodiments, information can be mailed or e-mailed to the seller and the seller can enter this data into the system for the customer. From this input information, the system can perform many functions. For example, accessory images can be presented for the customer to browse and composite images can be generated.

Figure 14:
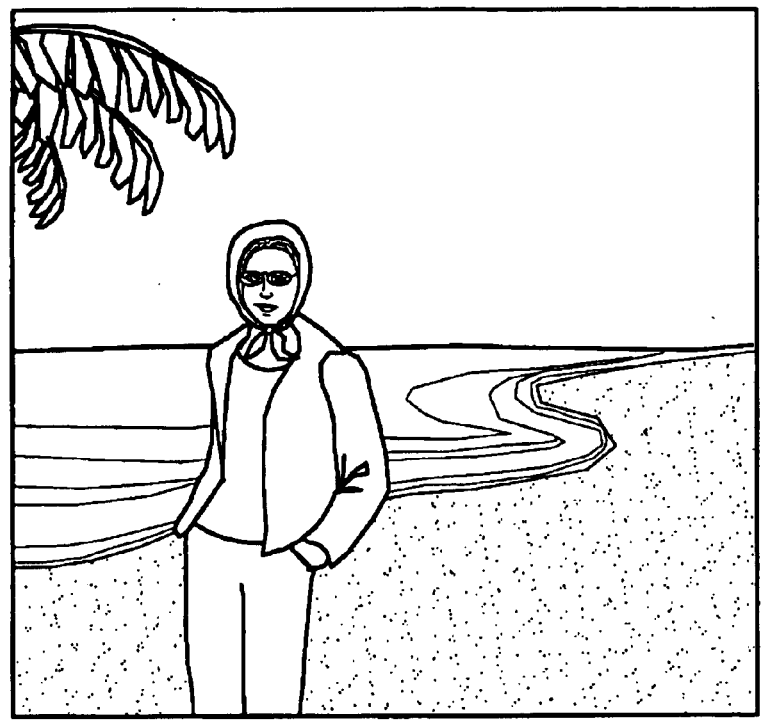
FIG. 14 shows a composite image of a person wearing sunglasses at the beach.

In some embodiments, the composite image may also include or be generated from an image of a background setting where the customer wants to see the intended recipient wearing the selected accessory. For example, people often wear sunglasses at the beach. Accordingly, it is desirable for the composite image to be generated from a third image comprising a background image such as a beach, in addition to the first image and second image. For example, the composite image shown in FIG. 14 is generated from the intended recipient's image, the image of a selected pair of sunglasses, and a background image of a beach. By generating composite images in this manner, the customer can preview how the intended recipient of the accessory might look in a setting that he or she might want to wear the accessory.

In this regard, the system may also provide an electronic database of background images including data of images of beaches, formal settings such as parties, city skylines, etc. A third computer program for selecting data of a background image from the electronic database of background images can preferably be provided on, or can be accessible to, the server computer. Alternatively, the background images may be provided by the customer, and may be input into the client computer in the same or different manner as the image of the intended recipient is provided to the system.

Once data of the composite image is generated 144 by the server computer, the data can be transmitted 146 to the client computer. The client computer can then direct the output device operatively coupled to the client computer to display the composite image for previewing by the customer. For example, the selected accessory, as it would appear on the intended recipient, is displayed by the output device for previewing by the customer. If the accessory does not appear to be suitable and/or the customer wants to preview more accessory images before purchasing, more accessory images can be previewed 128.

FIG. 15 shows an electronic display screen including a composite image 271 of a selected accessory on the image of an intended recipient of the accessory. A window 275 can display the price of the previewed accessory while a window 274 can display the name of a particular setting that the customer might want to view as a background image. The display screen shown in FIG. 15 also includes a scaling element 278 and a reset element 279. A plurality of accessory images 277 are displayed so that they can be selected and previewed by the customer. Alternatively, the accessory images 277 may be hyperlinks to other Web pages having accessory images with similar characteristics (e.g., the same style, size, color, price, etc.). The names and/or the prices of these accessories shown can also be displayed with respective displayed accessory images. The display screen also includes hyperlinks 273 to other Web pages including the home page, a favorites page, an ordering page, and a page showing an electronic shopping cart including a list of purchased accessories. A tool bar and Web site address window may also be shown on the display screen.

One or more favorable composite images may be saved for later evaluation and comparison with one or more other favorable composite images. After previewing a composite image and after the customer determines that the accessory has a favorable appearance on the intended recipient, the customer can save this composite image on the information storage medium in a designated file. At any time, the customer can retrieve these images and re-display them at any suitable time so that favorable images can be compared to each other. For instance, favorable images can be re-displayed and compared at a later date by the customer. Advantageously, this permits a customer to compare and re-compare favorable accessories so that the customer can determine which accessories which are the most desirable.

Figure 16:
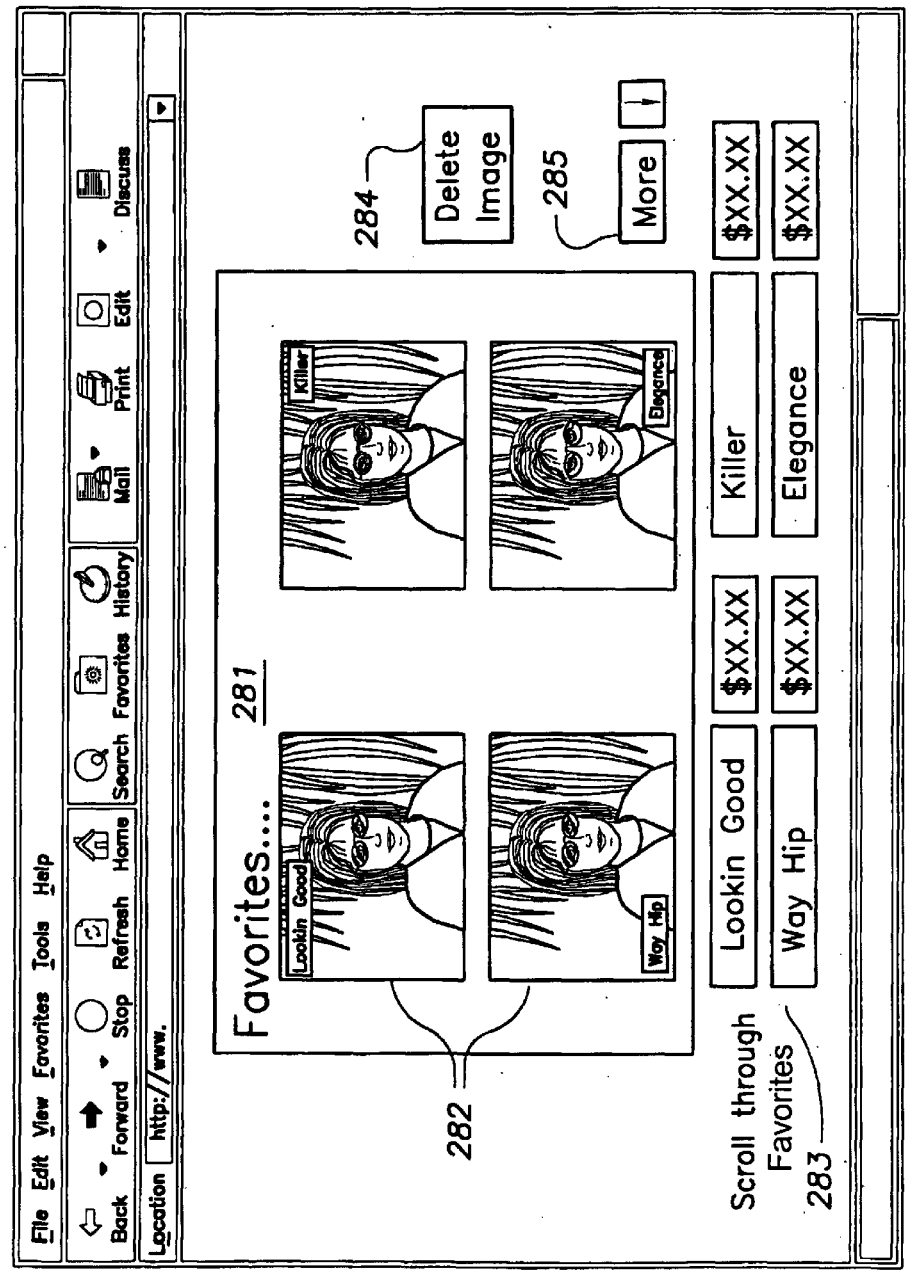

One illustration of how favorable composite images can be saved and then represented can be described with reference to FIGS. 15 and 16. For example, after a customer decides that the accessory shown in a composite image shown in FIG. 15 is favorable, a button 272 can be selected to add the previewed image or accessory to a "favorites" list. The favorites list may include one or more composite images which the customer has determined are favorable, and can be re-presented to the customer for re-evaluation and comparison with other composite images. To view the favorites list, the "favorite" hyperlink 283 can be selected and one or more display screens having composite images displaying favorable accessories can be viewed and compared with other composite images. More specifically, the customer can compare, in a side-by-side or sequential manner, a variety of favorable composite images to determine which accessories are the most desirable. A "more" button 285 can be selected by the customer to display additional favorable composite images, favorite screens, or accessory images. This process can be repeated as many times as desired (e.g., two or more times) to find desirable accessories to purchase.

Saved favorable composite images can be displayed in any suitable manner. If desired, the favorable composite images can be displayed in an array. For example, as shown in FIG. 16, the previously saved composite images 282 can be displayed in a tile format on a favorites screen 281 for the customer to preview. The saved composite images can also be displayed in a cascading or overlapping format. The display screen can also include a scroll button which permits the customer to scroll through the saved favorable images. As shown in FIG. 16, next to each composite image, the display screen can show the name of the accessory image and the price of the accessory shown.

Moreover, any of the displayed or saved favorable images can be deleted by the customer. As shown in FIG. 16, a delete button 284 can be provided for deleting one or more of the composite images from the display screen and the favorites list. By using the delete function of the invention, desired accessories can be obtained in an efficient -manner. For example, the customer can evaluate a first set of favorable composite images. One or more of the less favorable composite images in the first set can then be deleted to form a second set of favored composite images. More accessories can be optionally selected and more composite images may be generated, displayed, evaluated, and then saved with the second set of favored composite images. Subsequently, the second set of favored composite images can be displayed, and then evaluated. One or more of the less favorable composite images of the second set can be deleted to form a third set of favored images. By displaying, evaluating, saving and/or deleting favored composite images one or more times, each subsequently generated set of composite images contains more desirable images. From these images, desired accessories can be obtained.

After the customer no longer wishes to preview accessory images, desired accessories can be purchased in any suitable manner. For example, the accessory can be purchased with cash or by check, credit-card, or debit card at a kiosk or store. If the customer is at home and is using her home computer as the client computer, then the preferred mode of payment is by credit card, debit card or other form of electronic payment. Preferably, the customer can purchase the desired accessory electronically.

Information of the purchase can be sent from the client computer to the server computer operated by the seller 130. For example, the purchase information can be sent to the seller's production facility or inventory facility so that accessories may be shipped from these locations. For example, if accessories are not stocked at the kiosk, or if the desired accessory is not in stock at the time of purchase, the purchase information can be sent to the seller via the Internet. Also, if the accessory is purchased at the customer's home, the purchase information can be sent to the seller via the Internet. After the seller receives the purchase information, purchase confirmation information is optionally sent to the client computer used by the customer 148, or can be sent by mail or e-mail to any location desired by the customer. The desired accessory can then be produced at the production facility or taken from an existing inventory of accessories at the inventory facility. The purchased accessory can then be shipped to the customer's home (or other location desired by the customer) or to the kiosk for the customer to pick up at his or her convenience (if the accessory was purchased at the kiosk).

An embodiment of the invention is described in the following Example. The following Example is intended to be illustrative and is not intended to limit the invention.

EXAMPLE

In an illustrative example of one embodiment of the invention, a customer at a kiosk views a monitor which displays the Web pages of an accessory seller's Web site. The monitor can include touch-screen features so that the customer can interactively select one or more buttons or hyperlinks displayed on the Web pages of the Web site so that the customer can maneuver through the Web site. After viewing the monitor, a selectable button displayed on the monitor can be selected so that the picture of the customer is taken. After taking the customer's picture, plural sunglass images are displayed in an array on the monitor for the customer to evaluate. The customer then selects one or more of the sunglass images for previewing. Shortly after selecting the preferred sunglass images, the monitor automatically displays a composite image of the customer with the sunglasses on the customer. The customer determines if the pair of sunglasses displayed are suitable. Suitable composite images are saved by the customer by selecting a button at the kiosk for saving images. The customer selects more sunglass images, evaluates more composite images, saves favorable images and deletes less favorable images along the way. Eventually, a desired pair of sunglasses is found. Once a desired pair of sunglasses is found, the customer purchases the sunglasses. Subsequently, a drawer or panel at the kiosk opens permitting the customer to receive the selected sunglasses to take home. Alternatively, the customer inputs his or her address at the kiosk so that the purchased sunglasses are shipped to his or her home.

While embodiments of the invention have been particularly described with respect to particularly illustrated embodiments, it will be appreciated that various alterations, modifications and adaptations may be made based on the present disclosure, and are intended to be within the spirit and scope of the present invention. Moreover, one or more features of any embodiment of the invention can be combined with any one or more features of any other embodiment of the invention. For example, although many illustrations have been provided using sunglasses as an example, any of the systems and methods of the invention (or any component thereof) described as being useful to preview and purchase sunglasses can be used to preview and purchase other accessories such as jewelry.

What is claimed is:

1. A method for previewing an accessory to be worn by a person, the method comprising:

providing a first image to an input device at a first location, the first image including at least a portion of the person;

transmitting data of the first image to a server computer at a second location, the server computer being linked to different accessory-provider computer sites respectively having different accessories for viewing;

selecting a second image from an electronic database of images on or accessible to the server computer, the second image comprising an image of one of the accessories to be worn on the portion of the person in the first image;

generating data of a composite image from the data of the first image and data of the second image with the server computer, the composite image including the accessory worn on the portion of the person; and displaying the composite image on an output device at the first location.

2. The method of claim 1 wherein transmitting data of the first image to a server computer comprises transmitting the data over the Internet.

3. The method of claim 1 wherein the first image comprises the face of the person, and wherein selecting the second image is performed in accordance with the person's interpupil distance.

4. The method of claim 1 further comprising purchasing the accessory after displaying the composite image.

5. The method of claim 1 further comprising:

manipulating data of the first image to modify a size of the first image to correspond to a template having a predetermined size, and wherein selecting the second image comprises using the template to select the second image.

6. The method of claim 1 further comprising:

manipulating data of the first image to modify a size of the first image to correspond to a template having a predetermined size, and wherein generating data of the composite image comprises using data of the template to generate data of the composite image.

7. The method of claim 1 wherein the accessory comprises sunglasses.

8. The method of claim 1 further comprising:

selecting a third image of a background setting prior to generating data of a composite image, and wherein generating data of a composite image comprises generating data of a composite image from the data of the first image, data of the second image, and data of the third image.

9. The method of claim 1 wherein the input device comprises a digitai camera.

10. The method of claim 1 wherein the accessory comprises cosmetics or jewelry.

11. The method of claim 1 wherein the first location includes a kiosk.

12. A method for previewing a pair of sunglasses to be worn by a person, the method comprising:

providing a first image to an input device at a first location, the first image including at least a face portion of the person;

transmitting data of the first image to a server computer at a second location;

selecting a second image from an electronic database of images on or accessible to the server computer, the second image comprising an image of a pair of sunglasses to be worn on the portion of the person in the first image;

generating data of a composite image from the data of the first image and data of the second image with the server computer, the composite image including the pair of sunglasses worn on the portion of the person;

displaying the composite image on an output device at the first location; and displaying a shaded image, wherein a shade of the shaded image corresponds to a shade seen by a person wearing the pair of sunglasses.

13. A method for previewing an article, the method comprising:

providing data of a first image of at least a portion of an intended recipient of the article to a server computer, the server computer being linked to different article-provider computer sites respectively having different articles for viewing;

selecting a second image from an electronic database of images, the second image comprising an image of one of the articles to be worn on the portion of the intended recipient in the first image;

generating data of a composite image illustrating the article being worn on said portion from the data of the first image and data of the second image with the server computer;

transmitting the data of the composite image from the server computer to a client computer; and displaying the composite image on an output device in communication with the client computer.

14. The method of claim 13, whrein the article comprises sunglasses.

15. The method of claim 13 wherein the output device is located at the customer's home.

16. The method of claim 13 wherein the client computer is located at a kiosk.

17. The method of claim 13 further comprising manipulating data of the first image so that the first image is modified and corresponds to a template.

18. The method of claim 17 further comprising selecting plural article images from the database with the template and displaying the plural article images.

19. The method of claim 13 wherein transmitting the data of the composite image from the server computer to the client computer comprises transmitting the data of the composite image from the server computer to the client computer via the Internet.

20. The method of claim 19 wherein displaying the composite image on the output device comprises displaying the composite image on a Web page.

21. The method of claim 13 wherein providing data of the first image comprises retrieving data of the first image from an information storage medium on or accessible to the server computer.

22. The method of claim 21 wherein the intended recipient of the article is a customer.

23. The method of claim 13 wherein the article comprises jewelry or cosmetics.

24. The method of claim 13 further comprising manually entering data of an intended recipient's body parameters, selecting a plurality of article images from the electronic database of images in accordance with the data of the intended recipient's body parameters, and displaying the plurality of article images.

25. A system for previewing an accessory, the system comprising:

an input device for receiving a first image, wherein the first image includes an image of at least a portion of a person;

a client computer operatively coupled to the input device;

a server computer including a first computer program for selecting data of a second image from an electronic database of images, the server computer being linked to different accessory-provider computer sites respectively having different accessories for viewing, the second image comprising an image of one of the accessories to be worn on the portion of the person in the first image, and a second computer program for generating data of a composite image illustrating the accessory being worn on said portion of a person from data of the first image and data of the second image, wherein the server computer is operatively coupled to the client computer; and an output device for displaying the composite image, wherein the output device is operatively coupled to the client computer, wherein the input device, client computer, and the output device are at a first location and wherein the server computer is located at a second location.

26. The system of claim 25 wherein the server compuer and the client computer are operatively coupled via the Internet.

27. The system of claim 25 further comprising a firewall between the server computer and the client computer.

28. The system of claim 25 further comprising an Internet service provider intermediate between the client computer and the server computer.

29. The system of claim 25 wherein the server computer comprises a third computer program for processing purchases.

30. The system of claim 25 wherein the accessory comprises sunglasses.

31. The system of claim 25 wherein the server computer comprises a third computer program for selecting a background image from an electronic database of background images.

32. A system for previewing an accessory, the system comprising:

an information storage medium comprising a first electronic database of images of people;

a server computer, the server computer being linked to different accessory-provider computer sites respectively having different accessories for viewing, and the server computer including (i) a first computer program for selecting a first image from the first electronic database, the first image comprising an image of an intended recipient of an accessory, (ii) a second computer program for selecting a second image from a second electronic database, the second image comprising an image of one of the accessories to be worn on the intended recipient in the first image and (iii) a third computer program for generating data of a composite image illustrating the accessory being worn on the intended recipient from the data of the first image and data of the second image;

a client computer for receiving the data of the composite image, wherein the client computer is operatively coupled to the server computer; and an output device for displaying the composite image. wherein the output device is operatively coupled to the client computer.

33. The system of claim 32 wherein the client computer and the server computer are operatively coupled via the Internet.

34. The system of claim 32 further comprising an input device operatively coupled to the client computer.

35. The system of claim 32 wherein the accessory comprises sunglasses.

36. The system of claim 32 further comprising a kiosk, wherein the client computer is at the kiosk.

37. The system of claim 32 wherein the server computer further comprises:

a fourth computer program for processing a purchasing transaction.

38. The system of claim 32 wherein the information storage medium includes two or more databases, each of the databases containing different accessories.

39. The system of claim 22 wherein the intended recipient is a customer.

40. The method of claim 32 wherein the computer sites are electronic databases.

\* \* \* \* \*